United States Patent
Tsuchiya et al.

(10) Patent No.: US 12,020,514 B2
(45) Date of Patent: Jun. 25, 2024

(54) SERVER AND POWER SUPPLY SYSTEM FOR CHARGING ELECTRIC VEHICLES

(71) Applicant: TOYOTA JIDOSHA KABUSHIKI KAISHA, Toyota (JP)

(72) Inventors: Yoshiyuki Tsuchiya, Nagoya (JP); Kazuki Kubo, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 107 days.

(21) Appl. No.: 17/719,980

(22) Filed: Apr. 13, 2022

(65) Prior Publication Data

US 2022/0392270 A1 Dec. 8, 2022

(30) Foreign Application Priority Data

Jun. 8, 2021 (JP) .................... 2021-096004

(51) Int. Cl.
*G06Q 10/02* (2012.01)
*B60L 53/14* (2019.01)
(Continued)

(52) U.S. Cl.
CPC ............. *G07B 15/02* (2013.01); *B60L 53/14* (2019.02); *B60L 53/68* (2019.02); *G06Q 10/02* (2013.01); *G08G 1/14* (2013.01)

(58) Field of Classification Search
CPC ................................. B60L 53/14; B60L 53/68
See application file for complete search history.

(56) References Cited

U.S. PATENT DOCUMENTS

2009/0271227 A1 * 10/2009 Hayat .................. G06Q 10/025
  705/26.1
2010/0283426 A1 * 11/2010 Redmann .............. B60L 3/0069
  320/109
(Continued)

FOREIGN PATENT DOCUMENTS

JP    5475407 B2    4/2014
WO    WO-2022123234 A1 *  6/2022

OTHER PUBLICATIONS

Shahan, Zachary; "Is Trojan Energy the Future of Electric Car Charging?"; Published Sep. 6, 2020, Accessed as of Sep. 18, 2020; CleanTechnica.com; pp. 1-4; https://cleantechnica.com/2020/09/06/is-trojan-energy-the-future-of-electric-car-charging/ (Year: 2020).*

(Continued)

*Primary Examiner* — Emmett K. Walsh
*Assistant Examiner* — Michael C Moroney
(74) *Attorney, Agent, or Firm* — Dinsmore & Shohl LLP

(57) ABSTRACT

A power supply equipment provided for each of parking slots is configured to be able to be stored under a ground, and is configured to supply power to a vehicle parked in a corresponding parking slot with the power supply equipment protruding from the ground. A server that manages each of the parking slots and the power supply equipment is configured to receive a reservation request that specifies a reservation start time of the parking slot. The server is configured to reserve, from a vacant slot, out of the parking slots, that is unreserved at the reservation start time, a parking slot with a neighboring parking slot on at least one side unreserved at the reservation start time with priority over a parking slot with neighboring parking slots on both sides reserved at the reservation start time, when the server receives the reservation request.

8 Claims, 16 Drawing Sheets

(51) Int. Cl.
  *B60L 53/68* (2019.01)
  *G07B 15/02* (2011.01)
  *G08G 1/14* (2006.01)

(56) References Cited

U.S. PATENT DOCUMENTS

| | | | | |
|---|---|---|---|---|
| 2012/0010913 A1* | 1/2012 | Lele | G06Q 10/02 | 705/5 |
| 2012/0173292 A1* | 7/2012 | Solomon | G06Q 10/02 | 705/5 |
| 2012/0286730 A1* | 11/2012 | Bonny | B60L 53/14 | 320/109 |
| 2014/0052482 A1* | 2/2014 | Le Marier | G06Q 10/02 | 705/5 |
| 2014/0089016 A1* | 3/2014 | Smullin | G06Q 10/02 | 705/5 |
| 2014/0316939 A1* | 10/2014 | Uyeki | B60L 3/12 | 705/26.9 |
| 2015/0226572 A1* | 8/2015 | North | B60L 53/66 | 701/400 |
| 2015/0306974 A1* | 10/2015 | Mardall | H01M 10/625 | 429/120 |
| 2018/0253671 A1* | 9/2018 | Kuhara | A47L 9/2889 | |
| 2018/0339601 A1* | 11/2018 | Kruszelnicki | B60L 53/16 | |
| 2020/0130643 A1* | 4/2020 | Bode | B60L 53/31 | |
| 2020/0167701 A1* | 5/2020 | Debono | G06V 40/103 | |
| 2021/0053456 A1* | 2/2021 | Freeling-Wilkinson | B60L 53/18 | |
| 2021/0201211 A1* | 7/2021 | Tokuchi | G06Q 20/085 | |

OTHER PUBLICATIONS

Liu, Joseph K et al.; "Efficient Privacy-Preserving Charging Station Reservation System for Electric Vehicles"; Jul. 2016; The Computer Journal; vol. 59 Issue 7; journal pp. 1040-1053, document pp. 1-37; https://academic.oup.com/comjnl/article/59/7/1040/2568664 (Year: 2016).*

* cited by examiner

FIG. 8

《USER TERMINAL THAT HAS RECEIVED FIRST NOTIFICATION》

DATE AND TIME: 2021/XX/YY : – :

THERE IS NO VACANT SLOT IN THE ABOVE TIME RANGE.
PLEASE SPECIFY A DIFFERENT TIME RANGE

FIG. 9

《USER TERMINAL THAT HAS RECEIVED SECOND NOTIFICATION》

RESERVATION HAS BEEN COMPLETED

DATE AND TIME: 2021/XX/YY : – :

POSITION: E
(STATUS OF NEIGHBORING SLOTS: VACANT ON BOTH SIDES)

FIG. 10

≪THIRD NOTIFICATION: TERMINAL OF USER WHO MADE RESERVATION≫

RESERVATION HAS BEEN COMPLETED

DATE AND TIME: 2021/XX/YY : – :

POSITION: F
(STATUS OF NEIGHBORING SLOTS: NEIGHBORING G RESERVED)

FIG. 11

≪THIRD NOTIFICATION: TERMINAL OF NEIGHBORING USER≫

NEIGHBORING SLOT HAS BEEN RESERVED

DATE AND TIME: 2021/XX/YY : – :

POSITION: G
(STATUS OF NEIGHBORING SLOTS: NEIGHBORING F RESERVED)

FIG. 12

<<FOURTH NOTIFICATION: TERMINAL OF USER WHO MADE RESERVATION>>

RESERVATION HAS BEEN COMPLETED

DATE AND TIME: 2021/XX/YY : – :

POSITION: B
(STATUS OF NEIGHBORING SLOTS: NEIGHBORING A AND C RESERVED)

FIG. 13

<<FOURTH NOTIFICATION: TERMINAL OF NEIGHBORING USER>>

NEIGHBORING SLOT HAS BEEN RESERVED

DATE AND TIME: 2021/XX/YY : – :

POSITION: *
(STATUS OF NEIGHBORING SLOTS: ****)

SERVER AND POWER SUPPLY SYSTEM FOR CHARGING ELECTRIC VEHICLES

CROSS-REFERENCE TO RELATED APPLICATION

This application claims priority to Japanese Patent Application No. 2021-096004 filed on Jun. 8, 2021, incorporated herein by reference in its entirety.

BACKGROUND

1. Technical Field

The present disclosure relates to a server and a power supply system, and more particularly to a technique for managing power supply equipment that can be stored under the ground (hereinafter, also referred to as "underground power supply equipment").

2. Description of Related Art

Japanese Patent No. 5475407 (JP 5475407 B) discloses underground power supply equipment. The underground power supply equipment disclosed in JP 5475407 B includes a base pole (fixed portion) and a charging pole (movable portion). A user can pull out the charging pole stored under the ground above the ground by pulling the charging pole upward while holding a handle provided on the top surface (top surface portion) of the charging pole.

SUMMARY

Underground power supply equipment has room for improvement in terms of convenience. For example, when a user uses a station including a plurality of parking slots and underground power supply equipment provided for each parking slot, the following problems may occur. The underground power supply equipment included in the station is, for example, the underground power supply equipment disclosed in JP 5475407 B.

When the user attempts to park the vehicle in one parking slot included in the above station and a charging pole provided for a parking slot next to the one parking slot sticks out to the ground, the charging pole may interfere with the parking, which makes it harder for the user to park the vehicle than in the case where the charging pole is stored under the ground. As described above, the convenience of the user may decrease depending on the state of the underground power supply equipment.

The present disclosure has been made to solve the above problems, and an object thereof is to make the underground power supply equipment easy for users to use.

A server according to a first aspect of the present disclosure is configured to manage a plurality of parking slots and power supply equipment provided for each of the parking slots. The power supply equipment provided for each of the parking slots is configured to be able to be stored under a ground, and is configured to supply power to a vehicle parked in a corresponding parking slot with the power supply equipment protruding from the ground. The server is configured to receive a reservation request that specifies a reservation start time for the parking slot. The server is configured to reserve, from a vacant slot, out of the parking slots, that is unreserved at the reservation start time, a parking slot with a neighboring parking slot on at least one side unreserved at the reservation start time with priority over a parking slot with neighboring parking slots on both sides reserved at the reservation start time, when the server receives the reservation request.

The power supply equipment is underground power supply equipment that can be stored under the ground. In the server, a parking slot with a neighboring parking slot on at least one side unreserved at the reservation start time is reserved with priority over a parking slot with neighboring parking slots on both sides reserved at the reservation start time. It is highly possible that a vehicle can be easily parked in the parking slot with a neighboring parking slot on at least one side unreserved at the reservation start time. The server facilitates a reservation of a parking slot in which the user can easily park a vehicle. This makes it easier for the user to use the underground power supply equipment.

The server may be configured to reserve, from the vacant slot, a one side-vacant slot with a neighboring slot on one side unreserved at the reservation start time with priority over a both side-reserved slot with neighboring slots on both sides reserved at the reservation start time, and reserve a both side-vacant slot with neighboring slots on both sides unreserved with priority over the one side-vacant slot, when the server receives the reservation request.

It is considered to be easier to park a vehicle in the one-side vacant slot than in the both side-reserved slot and it is considered to be easier to park a vehicle in the both side-vacant slot than in the one side-vacant slot. When the server having the above configuration receives the reservation request from the user, the server makes a reservation in order from a vacant slot in which it is easier to park a vehicle. This facilitates a reservation of a parking slot in which it is easier for the user to park a vehicle.

The server may be configured to acquire a reservation end time corresponding to the reservation start time based on the reservation request when the server receives the reservation request. The vacant slot may be a parking slot, out of the parking slots, that is unreserved for a reservation period from the reservation start time to the reservation end time. The server may be configured to maintain the power supply equipment corresponding to the unreserved parking slot as stored under the ground. The server may be configured to permit only a user who made the reservation request to use the power supply equipment corresponding to the reserved parking slot for the reservation period when the parking slot is reserved based on the reservation request.

With the server having the above configuration, the power supply equipment corresponding to the unreserved parking slot is maintained as stored under the ground. That is, when the reserved parking slot is the both side-vacant slot, the power supply equipment corresponding to the parking slots on both sides is stored under the ground. Thus, it becomes easier to park a vehicle in the both side-vacant slot more reliably. With the server, by reserving a parking slot, the user can exclusively use the power supply equipment corresponding to the reserved parking slot for the reservation period. This makes it easier for the user to use the underground power supply equipment.

The server may determine a time a predetermined time after the reservation start time specified by the reservation request as the reservation end time. Alternatively, the reservation end time determined by the user may be included in the reservation request.

The server may be configured to reserve one vacant slot for the reservation period when there is a vacant slot for the reservation period at a time of reception of the reservation request, and to notify the user who made the reservation request that there is no vacant slot for the reservation period when there is no vacant slot for the reservation period at the time of reception of the reservation request.

With the server having the above configuration, the user can know whether there is a vacant slot for the reservation period related to the reservation request (that is, the reservation period corresponding to the reservation start time specified by the user). This makes it easier for the user to use the underground power supply equipment.

The server may be configured to, when the server reserves one parking slot in response to the reservation request, notify a user who made the reservation request, of identification information of the reserved parking slot and a reservation status of neighboring slots on both sides of the reserved parking slot.

With the server having the above configuration, the user can receive the identification information of the reserved parking slot. The identification information indicates which of the parking slots was reserved. Based on the identification information, the user can identify the reserved parking slot from the parking slots. In addition, the user can know the reservation status of the neighboring slots on both sides of the reserved parking slot. Since the user knows the surrounding situation in advance, the user can easily park a vehicle in the parking slot.

The server may be configured to cancel a reservation of the parking slot in response to a reservation cancellation request. The server may be configured to, when a reservation of a first parking slot that is one of the parking slots is canceled, notify a user who reserved a second parking slot located next to the first parking slot that the reservation of the first parking slot has been canceled.

With the server having the above configuration, it becomes easier for the user who reserved the second parking slot to accurately know the reservation status of the neighboring slots on both sides of the second parking slot. Since the user knows the surrounding situation in advance, the user can easily park a vehicle in the second parking slot in an appropriate manner.

The server may provide any of the above notifications to the user terminal. The user terminal may be associated with the user of the vehicle in advance and registered in the server. The user terminal may be a vehicle on which the user rides, or may be a mobile terminal carried by the user.

The server may be configured to maintain the power supply equipment corresponding to the parking slot in which no vehicle is parked as stored under the ground.

With the server having the above configuration, when the user parks a vehicle in the parking slot (more specifically, the parking slot in which no vehicle is parked), the power supply equipment corresponding to the parking slot is maintained as stored under the ground. Since the power supply equipment stored under the ground is not an obstacle, it is easy for the user to appropriately park a vehicle in the parking slot. In addition, the user can determine whether the surrounding power supply equipment can protrude from the ground based on the state of the surrounding parking slots (whether a vehicle is parked). Since the user knows the surrounding situation in advance, the user can easily park a vehicle in the parking slot.

A power supply system according to a second aspect of the present disclosure includes a plurality of parking slots, power supply equipment provided for each of the parking slots, and any of the above-mentioned servers. The parking slots are arranged in a row. The power supply equipment provided for each of the parking slots includes a movable portion including a power supply port of the power supply equipment, an actuator that moves the movable portion, a power supply circuit that supplies electric power to the power supply port, and a control device that controls the actuator and the power supply circuit. The movable portion is configured to be displaced within a movable range including a first position and a second position, the first position being a position where the power supply port is stored under a ground and a top surface of the power supply equipment constitutes a road surface together with the ground, and the second position being a position where the top surface of the power supply equipment protrudes from the ground and the power supply port is exposed on the ground. The control device is configured to wirelessly communicate with the server and control the actuator in accordance with an instruction from the server.

In the first position (storage position), the top surface of the power supply equipment constitutes a road surface together with the ground. Therefore, the vehicle can travel on the power supply equipment, and it becomes easier to park the vehicle in the parking slot around the power supply equipment. Further, the power supply equipment includes an actuator for moving the movable portion. Therefore, the power supply port of the power supply equipment can be exposed on the ground by the actuator without the need for the user to pull up the movable portion. Further, the control device operates in accordance with the signal transmitted from the server by wireless communication with the server. Therefore, the server can remotely operate the control device of the power supply equipment, for example, based on the reservation status of each parking slot.

The power supply port of the power supply equipment is a part that outputs electric power. The movable portion may include a power supply cable. The power supply port of the power supply equipment may be a first end of the power supply cable (for example, a connector that can be connected to the inlet of the vehicle). A second end of the power supply cable may be connected to the power supply circuit. The power supply port of the power supply equipment may also be an outlet.

The server may be configured to, in a case where a predetermined condition (hereinafter, also referred to as "raising condition") is satisfied when a vehicle is parked in one of the parking slots, displace the movable portion of the power supply equipment corresponding to the parking slot in which the vehicle is parked from the first position to the second position.

The server displaces the movable portion of the power supply equipment from the first position (storage position) to the second position (power supply position) as described above, which saves the user from operating the movable portion of the power supply equipment when using the power supply equipment. This improves the convenience of the user.

When a vehicle is parked in any of the parking slots, the server may request authentication from the user who reserved the parking slot. The raising condition may be satisfied when the server succeeds in user authentication.

A power supply system according to a third aspect of the present disclosure includes a plurality of stations. Each of the stations includes a plurality of parking slots and power supply equipment provided for each of the parking slots. The power supply equipment provided for each of the parking slots is configured to be able to be stored under a ground and includes a plug, and the power supply equipment is configured to supply electric power to the plug connected to an inlet of a vehicle parked in a corresponding parking slot with the power supply equipment protruding from the ground. The power supply system further includes a server that receives a reservation request that specifies a reservation start time for the parking slot. The server is configured to, when the server receives the reservation request from a user, select one station from the stations using a position of a vehicle belonging to the user who made the reservation request and a position of the inlet included in the vehicle, and reserve, from a vacant slot, out of the parking slots included in the selected one station, that is unreserved at the reservation start time, a parking slot with a neighboring parking slot on at least one side unreserved at the reservation start time with priority over a parking slot with neighboring parking slots on both sides reserved at the reservation start time.

Vehicles that can use the power supply equipment may be limited depending on the positional relationship between the parking slot and the power supply equipment. Whether the power supply equipment can be used may be determined depending on the position of the inlet included in the vehicle. Not all the stations of the power supply system include the power supply equipment that can be used by the user (and thus the vehicle belonging to the user). In the power supply system, the server selects one station from the stations included in the power supply system using the position of the vehicle belonging to the user and the position of the inlet included in the vehicle. With such a configuration, it becomes easier for the user of the vehicle to reserve the power supply equipment that is close to the position of the vehicle and that can be used by the vehicle. In addition, the power supply system also makes it easier for the user to reserve a parking slot that is easier for the user to park a vehicle. This makes it easier for the user to use the underground power supply equipment.

According to the present disclosure, the underground power supply equipment can be easily used by the user.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 8 is a diagram illustrating a notification process executed by a user terminal that has received a first notification from the server in the embodiment of the present disclosure;

FIG. 9 is a diagram illustrating a notification process executed by the user terminal that has received a second notification from the server in the embodiment of the present disclosure;

FIG. 10 is a diagram illustrating a notification process executed by a request user terminal that has received a third notification from the server in the embodiment of the present disclosure;

FIG. 11 is a diagram illustrating a notification process executed by a neighboring user terminal that has received a neighboring reservation notification signal from the server in the embodiment of the present disclosure;

FIG. 12 is a diagram illustrating a notification process executed by the request user terminal that has received a fourth notification from the server in the embodiment of the present disclosure;

FIG. 13 is a diagram illustrating a notification process executed by each of first and second neighboring user terminals that has received the neighboring reservation notification signal from the server in the embodiment of the present disclosure;

DETAILED DESCRIPTION OF EMBODIMENTS

Figure 1:
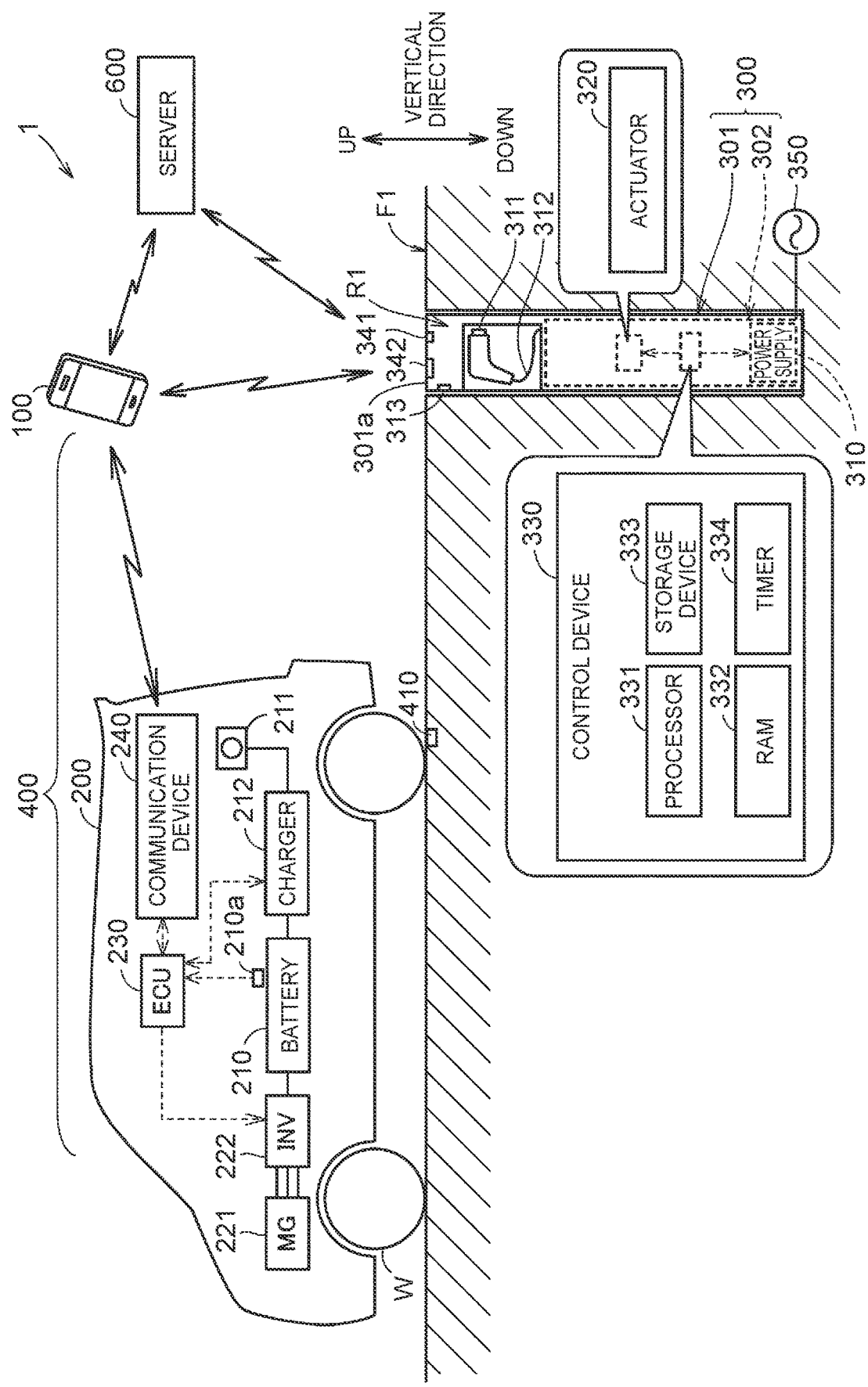
FIG. 1 is a diagram illustrating a configuration of a power supply system according to an embodiment of the present disclosure.

Hereinafter, embodiments of the present disclosure will be described in detail with reference to the drawings. In the drawings, the same or corresponding parts are denoted by the same reference sings and the description thereof will be made only once.

FIG. 1 is a diagram illustrating a configuration of a power supply system according to this embodiment. With reference to FIG. 1, a power supply system 1 includes a charging stand 300 and a parking slot 400 (parking space) corresponding to the charging stand 300. The charging stand 300 according to this embodiment corresponds to an example of the "power supply equipment" according to the present disclosure. The charging stand 300 is electric vehicle supply equipment (EVSE). The charging stand 300 is configured to be stored under the ground F1. The charging stand 300 corresponds to underground power supply equipment (power supply equipment that can be stored under the ground). The state of the charging stand 300 shown in FIG. 1 is a state in which the charging stand 300 is stored under the ground F1 (hereinafter, also referred to as a "stored state").

The charging stand 300 includes a movable portion 301 and a fixed portion 302. Each of the movable portion 301 and the fixed portion 302 has a tubular (for example, cylindrical) housing. The housing (tube) of the fixed portion 302 has a top surface and a bottom surface. The housing of the fixed portion 302 may be hermetically sealed. The housing (tube) of the movable portion 301 has a top surface 301a on the upper side and is open on the lower side. Further, the housing of the movable portion 301 is provided with a cable storage portion, which will be described later. The housing of the movable portion 301 has a larger diameter than the housing of the fixed portion 302, and is disposed outside the housing of the fixed portion 302 such that the central axes of the housings coincide with each other. The movable portion 301 is provided so as to be displaceable in the vertical direction (up-down direction) along the outer peripheral surface of the fixed portion 302. The material of each housing may be metal or plastic. The surface of each housing may be waterproofed.

The charging stand 300 is installed in a recess R1 extending downward from the ground F1. In the stored state, the entire charging stand 300 is stored inside the recess R1. The fixed portion 302 is fixed to the bottom surface of the recess R1. The fixed portion 302 includes a power supply circuit 310, an actuator 320, and a control device 330 in the housing. The movable portion 301 is driven by the actuator 320 and is displaced relative to the fixed portion 302. A sealing member may be provided in the gap between the outer peripheral surface of the housing of the movable portion 301 and the inner wall of the recess R1.

The movable portion 301 has a space for storing a connector 311 and a power supply cable 312 (hereinafter referred to as "cable storage portion"). The cable storage portion is, for example, a recess provided in the side surface of the movable portion 301 by machining a part of the tubular housing of the movable portion 301. The connector 311 is provided to a first end of the power supply cable 312. The connector 311 corresponds to a plug that can be connected to an inlet 211 of a vehicle 200. A second end (the end opposite from the first end) of the power supply cable 312 is connected to the power supply circuit 310 via an electric wire (not shown). In the stored state, the movable portion 301 includes the connector 311 and the power supply cable 312 in the cable storage portion. In this embodiment, the connector 311 corresponds to an example of the "power supply port" according to the present disclosure. The power supply cable 312 (including the connector 311) may be configured to be detachable from the movable portion 301. In the movable portion 301 with the power supply cable 312 detached, a connector for the power supply cable 312 (for example, an outlet to which the outlet plug of the power supply cable 312 is attached) corresponds to the power supply port of the charging stand 300.

The power supply circuit 310 is configured to be supplied with electric power from an alternating current (AC) power supply 350 and supply electric power to the movable portion 301 (more specifically, the power supply cable 312). The power supply circuit 310 includes a power conversion circuit and functions as a charger on the EVSE side. The AC power supply 350 supplies AC power to the power supply circuit 310. The AC power supply 350 may be a commercial power supply (for example, a power system provided by a power company). The power supply circuit 310 is controlled by the control device 330.

The power supply cable 312 has elasticity and flexibility. The cable storage portion may be provided with a cable reel configured such that the power supply cable 312 can be wound around the cable reel. The cable reel may be a mechanical self-winding device (for example, a spring cable reel). Further, a lid for opening and closing the cable storage portion may be provided. Further, a sensor for detecting whether the connector 311 and the power supply cable 312 are housed in the cable storage portion may be provided in the cable storage portion.

In the stored state, the top surface 301a of the movable portion 301 is flush with the ground F1, and the top surface 301a constitutes a road surface together with the ground F1. The top surface 301a according to this embodiment corresponds to an example of the "top surface of the power supply equipment" according to the present disclosure. The actuator 320 is configured to directly or indirectly apply power to the movable portion 301 to move the movable portion 301 in the vertical direction (see FIG. 2 described later). The actuator 320 may be an electric actuator that generates power by using electric power supplied from the power supply circuit 310. The displacement mechanism of the movable portion 301 may be a rack and pinion mechanism. For example, a rack gear may be fixed to the movable portion 301, and the actuator 320 may rotationally drive a pinion gear meshed with the rack gear. Alternatively, a rod connected to the piston may be fixed to the movable portion 301, and the actuator 320 may hydraulically move the piston. Alternatively, the actuator 320 may generate a magnetic force using electric power and directly apply power to the movable portion 301 using the magnetic force. The actuator 320 is controlled by the control device 330.

Figure 2:
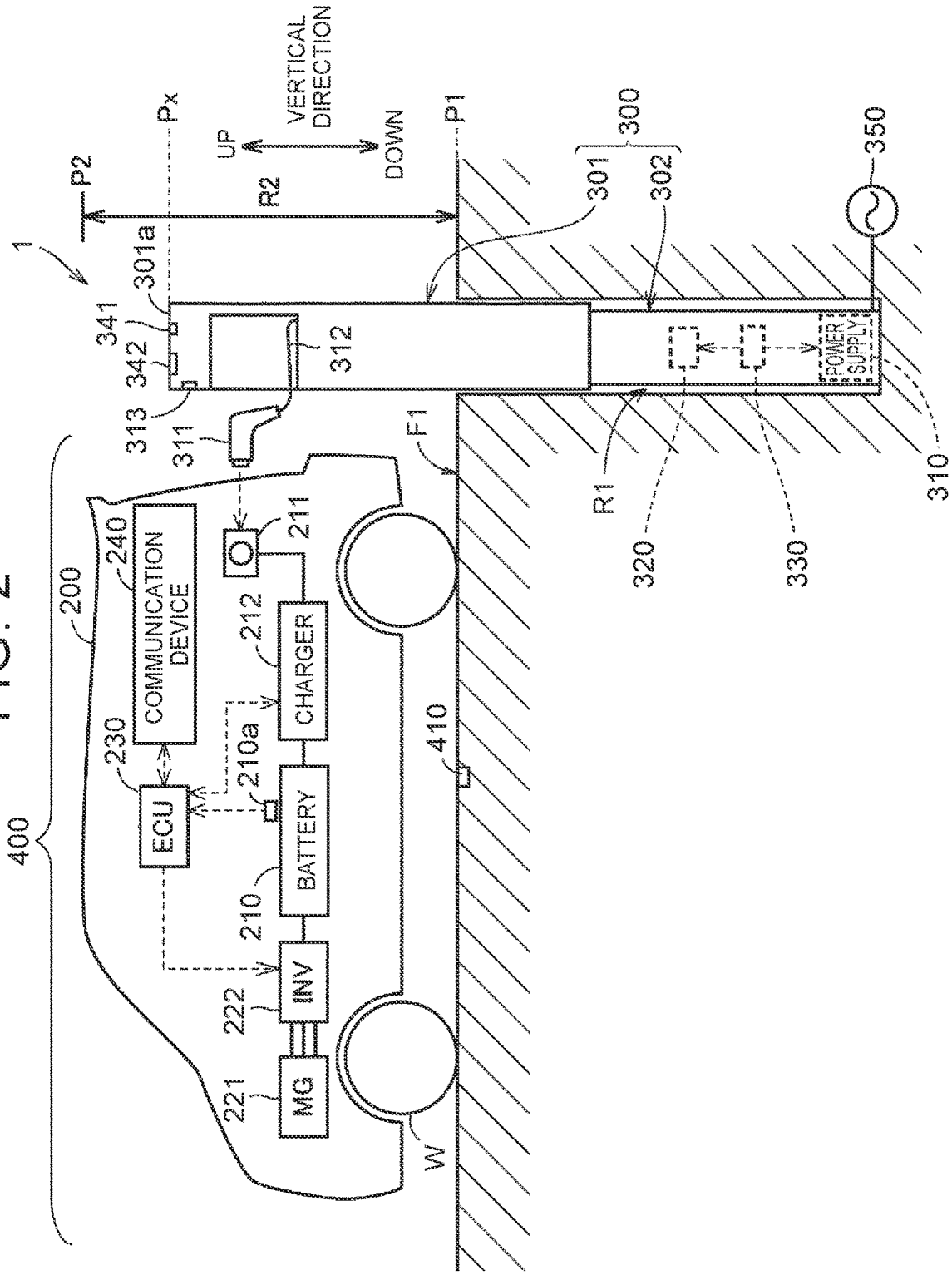
FIG. 2 is a diagram showing a state in which a movable portion of power supply equipment shown in FIG. 1 is raised.

FIG. 2 is a diagram showing a state in which the movable portion 301 is raised. With reference to FIG. 2, the movable portion 301 is displaced (raised and lowered) in the vertical direction so as to change the position of the top surface 301a. Hereinafter, for convenience of description, the position of the top surface 301a is regarded as the position of the movable portion 301.

The movable portion 301 is configured to be displaced within a movable range R2. A lower limit position P1 of the movable range R2 is the same height as the ground F1. When the position of the movable portion 301 is the lower limit position P1, the entire movable portion 301 (including the cable storage portion) is stored under the ground F1 (see FIG. 1). The state in which the position of the movable portion 301 is the lower limit position P1 corresponds to the stored state. In the stored state, the charging stand 300 does not supply power. In the stored state, the connector 311 cannot be connected to the inlet 211 of the vehicle 200. In the stored state, the vehicle 200 can travel on the top surface 301a.

On the other hand, an upper limit position P2 of the movable range R2 is set to a position sufficiently higher than the height of the inlet of a general vehicle. When the position of the movable portion 301 is the upper limit position P2, the top surface 301a protrudes from the ground, and the cable storage portion (connector 311 and power supply cable 312) of the movable portion 301 is exposed on the ground F1. Further, even when the position of the movable portion 301 is lower than the upper limit position P2 (for example, a position Px shown in FIG. 2), the cable storage portion may be exposed on the ground F1. When the movable portion 301 is raised to the position Px, the top surface 301a no longer constitutes a road surface, and the vehicle 200 cannot travel on the top surface 301a. The charging stand 300 is configured to supply power to the vehicle 200 with the movable portion 301 raised to the position Px. When the movable portion 301 is raised to the position Px, the connector 311 can be connected to the inlet 211 of the vehicle 200 parked in a predetermined parking space (parking slot 400 corresponding to the charging stand 300) that is set in the vicinity of the charging stand 300.

A parking sensor 410 is provided in the parking slot 400. The parking sensor 410 is configured to detect whether a vehicle is parked in the parking slot 400. The parking sensor 410 may include at least one of a laser and a camera. The detection result of the parking sensor 410 is output to a server 600 (FIG. 1). The server 600 can determine whether a vehicle has been parked in the parking slot 400 using the detection result of the parking sensor 410.

The movable range R2 includes a first position (for example, the lower limit position P1) and a second position (for example, the upper limit position P2 and the position Px). In the first position, the power supply port of the charging stand 300 is stored under the ground F1 and the top surface 301a constitutes a road surface together with the ground F1. In the second position, the top surface 301a protrudes from the ground F1 and the power supply port of the charging stand 300 is exposed on the ground F1. In this embodiment, the lower limit position P1 is the same position as the ground F1, but the lower limit position P1 may be set to a position slightly below the ground F1 or slightly above the ground F1.

With reference to FIG. 1, the movable portion 301 further includes a communication device 341, an environment sensor 342, and a touch panel display 313.

The communication device 341 is configured to be capable of wireless communication with the server 600. The communication device 341 may be configured to be able to communicate with a communication device other than the server 600. The communication device 341 transmits information received from the outside of the charging stand 300 to the control device 330. The control device 330 sequentially transmits the state of the charging stand 300 to the server 600 through the communication device 341. The control device 330 is also configured to wirelessly communicate with the server 600 and control the power supply circuit 310 and the actuator 320 in accordance with the instruction from the server 600.

The environment sensor 342 is provided on the top surface 301a of the movable portion 301. The environment sensor 342 is a sensor that acquires environmental information of the charging stand 300. The environment sensor 342 according to this embodiment acquires information indicating whether at least one of an object (including a vehicle) and a living body (including a person) is present upward of and around the top surface 301a. The environment sensor 342 may include at least one of a laser and a camera. The detection result of the environment sensor 342 is output to the control device 330.

The touch panel display 313 receives input from the user and displays various kinds of information. The touch panel display 313 is configured to receive instructions regarding power supply (for example, instructions for starting and stopping power supply). The touch panel display 313 is also configured to display the state of power supply (power supply being performed or power supply stopped) of the charging stand 300. The touch panel display 313 is controlled by the control device 330.

The control device 330 may be a computer. The control device 330 includes a processor 331, a random access memory (RAM) 332, a storage device 333, and a timer 334. As the processor 331, for example, a central processing unit (CPU) can be adopted. The storage device 333 is configured to be able to store the stored information. In addition to the program, the storage device 333 stores information used in the program (for example, maps, mathematical formulas, and various parameters). In this embodiment, as the processor 331 executes the program stored in the storage device 333, various controls in the charging stand 300 are executed. However, the various controls in the charging stand 300 are not limited to execution by software, and execution by dedicated hardware (electronic circuit) is possible. The number of processors included in the control device 330 can be set as appropriate, and a processor may be prepared for each predetermined control.

The vehicle 200 shown in FIGS. 1 and 2 is an electrified vehicle including a battery 210, devices for traveling using electric power stored in the battery 210 (for example, a motor generator 221 and an inverter 222 described later), and devices for charging the battery 210 using the charging stand 300 (for example, the inlet 211 and the charger 212 described later). The vehicle 200 according to this embodiment is a battery electric vehicle (BEV) without an engine (internal combustion engine). The vehicle 200 basically travels by being driven by the user.

A mobile terminal 100 shown in FIG. 1 corresponds to a mobile terminal carried by the user of the vehicle 200. The mobile terminal 100 includes a computer. In this embodiment, a smartphone equipped with a touch panel display is adopted as the mobile terminal 100. However, the present disclosure is not limited to this, and any mobile terminal can be adopted as the mobile terminal 100, and a tablet terminal, a wearable device (for example, a smart watch), an electronic key, and the like can also be adopted.

The mobile terminal 100 is configured to be capable of wireless communication with each of the charging stand 300 and the server 600. Predetermined application software (hereinafter, simply referred to as "application") is installed in the mobile terminal 100. The mobile terminal 100 is carried by the user of the vehicle 200, and can transmit and receive information to and from each of the charging stand 300 and the server 600 through the above application. The user can operate the above application through, for example, the touch panel display of the mobile terminal 100. Further, the touch panel display of the mobile terminal 100 is configured to be able to notify the user of the vehicle 200 of information.

The vehicle 200 further includes an electronic control unit (hereinafter referred to as "ECU") 230 and a communication device 240. The ECU 230 may be a computer. The ECU 230 includes a processor, a RAM, and a storage device (none of which are shown). Various vehicle controls are executed as the processor executes the program stored in the storage device. However, the vehicle control is not limited to execution by software, and execution by dedicated hardware (electronic circuit) is possible.

The ECU 230 is configured to communicate with the outside of the vehicle 200 through the communication device 240. The communication device 240 includes various communication interfaces (I/Fs). The communication device 240 may include a communication OF for wireless communication with the server 600 (FIG. 1) described later. Further, the communication device 240 mounted on the vehicle 200 and the mobile terminal 100 are configured to communicate wirelessly with each other. The ECU 230 can control the mobile terminal 100 by wireless communication to cause the mobile terminal 100 to notify the user. The communication between the communication device 240 and the mobile terminal 100 may be short-range communication (for example, direct communication in and around the vehicle).

The battery 210 includes a secondary battery such as a lithium ion battery or a nickel metal hydride battery. The secondary battery may be a battery assembly or an all-solidstate battery. Instead of the secondary battery, another power storage device such as an electric double layer capacitor may be adopted.

The vehicle 200 further includes a monitoring module 210a that monitors the state of the battery 210. The monitoring module 210a includes various sensors for detecting the state of the battery 210 (for example, voltage, current, and temperature), and outputs the detection result to the ECU 230. The monitoring module 210a may be a battery management system (BMS) having a state of charge (SOC) estimation function, a state of health (SOH) estimation function, a cell voltage equalization function, a diagnostic function, and a communication function, in addition to the above sensor function. The ECU 230 can acquire the state of the battery 210 (for example, temperature, current, voltage, SOC, and internal resistance) based on the output of the monitoring module 210a.

The vehicle 200 includes the motor generator (hereinafter referred to as "MG") 221 and the inverter (hereinafter referred to as "INV") 222 for electric traveling. The MG 221 is, for example, a three-phase AC motor generator. The MG 221 is driven by the INV 222 and is configured to rotate driving wheels W of the vehicle 200. The INV 222 is controlled by the ECU 230. The INV 222 drives the MG 221 using electric power supplied from the battery 210. Further, the MG 221 generates regenerative power and supplies the generated electric power to the battery 210 via the INV 222. The drive system of the vehicle 200 is not limited to the front wheel drive shown in FIGS. 1 and 2, and may be rear wheel drive or four-wheel drive.

The vehicle 200 includes the inlet 211 and the charger 212 for contact charging. The inlet 211 is located at the rear portion of the vehicle body (more specifically, the left side surface of the rear portion of the vehicle body) of the vehicle 200. The inlet 211 is configured to be connectable to the connector 311 of the power supply cable 312 of the charging stand 300. A contact is included in both the inlet 211 and the connector 311. When the connector 311 is attached to the inlet 211, the contacts come into contact with each other, and the inlet 211 and the connector 311 are electrically connected.

Hereinafter, the state in which the connector 311 is connected to the inlet 211 (that is, the state in which the charging stand 300 and the vehicle 200 are electrically connected via the power supply cable 312) is referred to as a "plug-in state". Further, the state in which the connector 311 is not connected to the inlet 211 (that is, the state in which the charging stand 300 and the vehicle 200 are not electrically connected) is referred to as a "plug-out state". Each of the vehicle 200 and the charging stand 300 includes a circuit (not shown) for detecting a connection state (plug-in state or plug-out state).

The charger 212 includes a power conversion circuit (not shown). The power conversion circuit converts electric power supplied to the inlet 211 from the outside of the vehicle into electric power suitable for charging the battery 210. For example, when AC power is supplied from the inlet 211, the charger 212 converts the supplied AC power into direct current (DC) power and supplies it to the battery 210. The charger 212 is controlled by the ECU 230.

Figure 3:
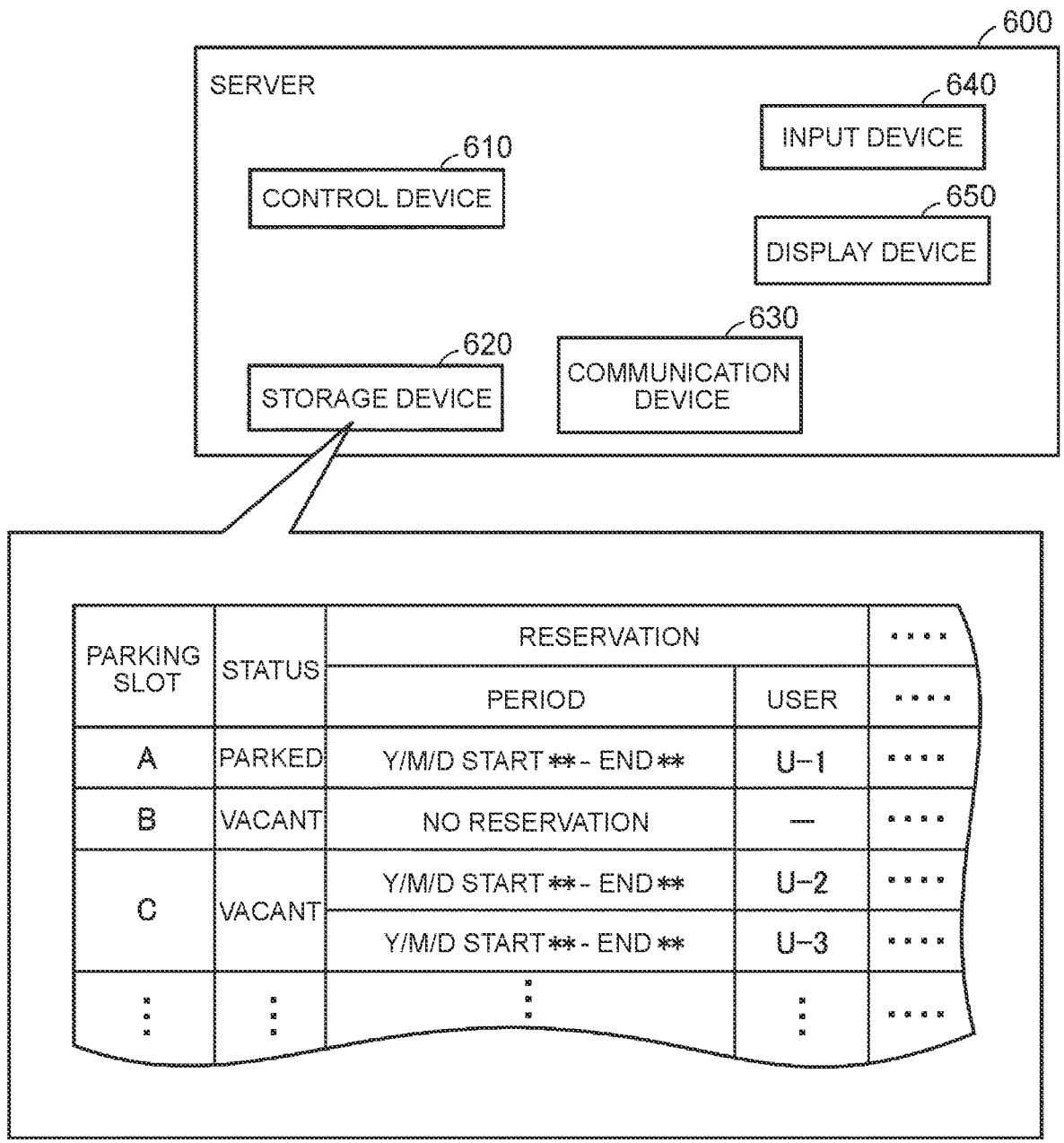
FIG. 3 is a diagram illustrating a configuration of a server shown in FIG. 1.

FIG. 3 is a diagram illustrating the configuration of the server 600 shown in FIG. 1. With reference to FIG. 3, in addition to FIGS. 1 and 2, the server 600 includes a control device 610, a storage device 620, a communication device 630, an input device 640, and a display device 650. The control device 610 includes a processor, a RAM, and a timer, and is configured to perform predetermined information processing. The control device 610 may be a computer. The storage device 620 is configured to be able to store the stored information. The storage device 620 stores, for example, a program executed by the processor and information used in the program (for example, maps, mathematical formulas, and various parameters). The communication device 630 includes various communication interfaces (I/Fs). The control device 610 is configured to communicate with the outside of the server 600 through the communication device 630. The server 600 is configured to be capable of communication with each of the mobile terminal 100 and the charging stand 300. The server 600 may also be configured to communicate with the vehicle 200 via the charging stand 300 while the battery 210 is being charged. The user can input information (including a command to the control device 610) to the server 600 through the input device 640. The input device 640 may be a keyboard or a touch panel, or may be a smart speaker that receives voice input. The display device 650 displays information to the user in accordance with the instruction from the control device 610.

In this embodiment, as the control device 610 (processor) executes the program stored in the storage device 620, various kinds of processing in the server 600 are executed. However, the various kinds of processing in the server 600 are not limited to execution by software, and execution by dedicated hardware (electronic circuit) is possible.

The power supply system 1 according to this embodiment includes a plurality of parking slots arranged in a row. The server 600 is configured to receive a reservation request that specifies a reservation start time and a reservation end time for a parking slot. When there is a vacant slot for a reservation period specified by the reservation request (that is, a period from the reservation start time to the reservation end time) at the time of reception of the reservation request, the server 600 reserves one vacant slot for the reservation period. The vacant slot according to this embodiment is a parking slot that has not been reserved for the reservation period.

Figure 4:
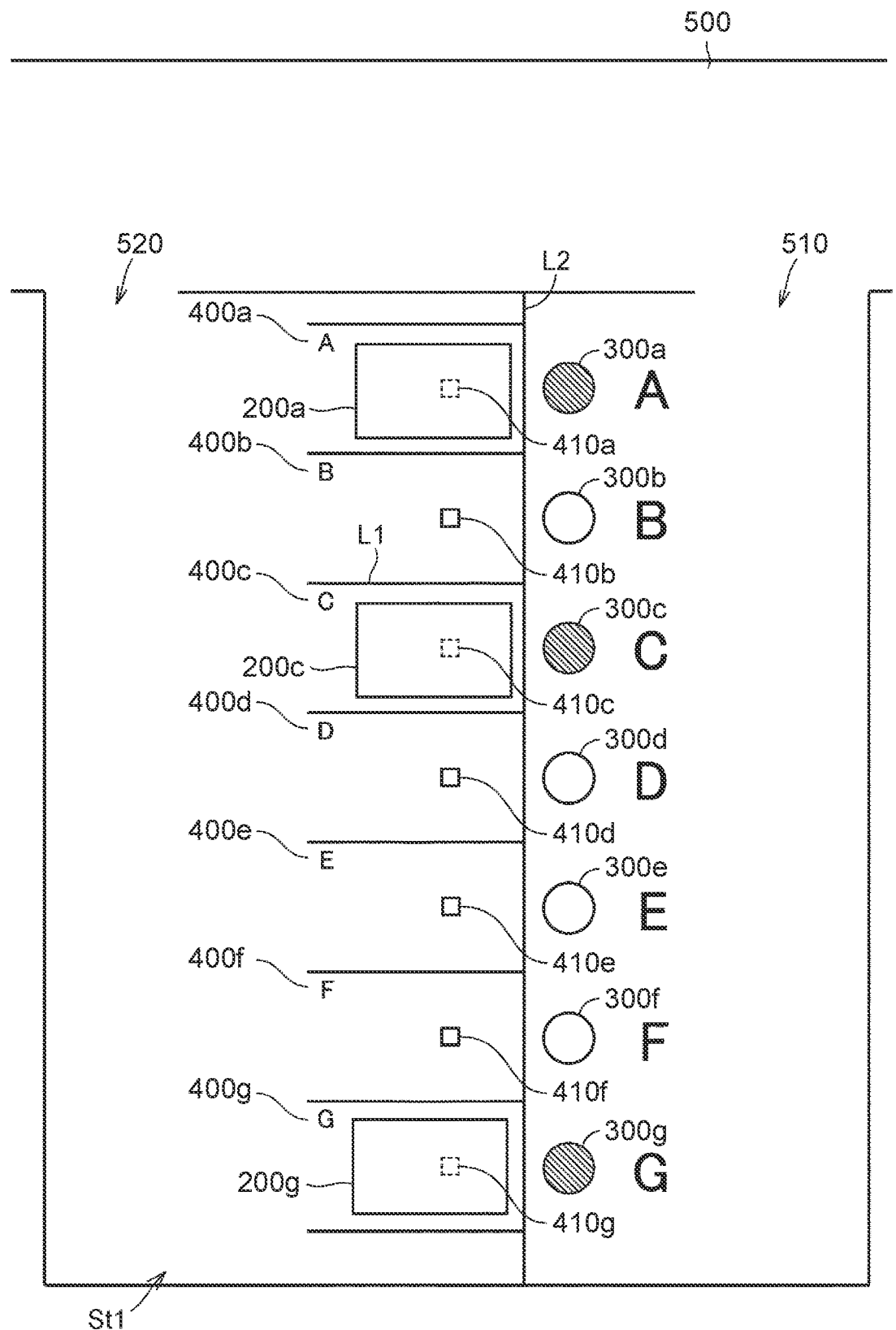
FIG. 4 is a plan view showing a first state of a station included in the power supply system according to the embodiment of the present disclosure.

FIG. 4 is a plan view showing a first state of a station St1 included in the power supply system 1 according to this embodiment. In FIG. 4, vehicles 200a, 200c, and 200g each have the same configuration as the vehicle 200 shown in FIG. 1. Further, charging stands 300a to 300g each have the same configuration as the charging stand 300 shown in FIG. 1. Parking slots 400a to 400g each correspond to the parking slot 400 shown in FIG. 1.

With reference to FIG. 4, the station St1 corresponds to a charging station for electrified vehicles. The station St1 is adjacent to a road 500. The station St1 includes the parking slots 400a to 400g and the charging stands 300a to 300g. The charging stands 300a to 300g are provided for the parking slots 400a to 400g, respectively. Parking sensors 410a to 410g are provided for the parking slots 400a to 400g, respectively. The parking slots 400a to 400g are partitioned by a plurality of partition lines L1 so as to be arranged side by side in the lateral direction. The parking slots 400a to 400g are provided along the width direction (direction orthogonal to the longitudinal direction) of each parking slots. A charging stand is provided for each parking slot. The charging stand corresponding to the parking slot is installed at a position adjacent to the parking slot in the longitudinal direction. A partition line L2 is drawn between the parking slots 400a to 400g and the charging stands 300a to 300g. The partition lines L1 and L2 are provided so as to be visible to the user. Each of the partition lines L1 and L2 may be lines drawn on the ground (for example, white lines).

Parking slot identification information (A to G) is also displayed so as to be visible to the user.

The station St1 includes an entrance 510 for entering the station St1 from the road 500 on the charging stand 300a to 300g side, and an exit 520 for exiting the station St1 to the road 500 on the parking slot 400a to 400g side. In each of the parking slots 400a to 400g, a vehicle is parked such that the rear surface of the vehicle faces the charging stand side. Each of the charging stands 300a to 300g is EVSE for a vehicle including an inlet at the rear of the vehicle body.

In the state shown in FIG. 4, the vehicles 200a, 200c, and 200g are parked in the parking slots 400a, 400c, and 400g, respectively, and no vehicle is parked in the parking slots 400b, 400d, 400e, and 400f. For example, when the parking slots 400a, 400c, and 400g are reserved among the plurality of parking slots included in the station St1 for a certain period, the station St1 is considered to be in the state shown in FIG. 4 during the above period. In this case, each of the unreserved parking slots 400b, 400d, 400e, and 400f corresponds to the vacant slot. The server 600 is configured to maintain the charging stand corresponding to the vacant slot (unreserved parking slot) in the stored state (the state in which the charging stand is stored under the ground). Therefore, the charging stands corresponding to the vacant slots (for example, the charging stands 300b, 300d, 300e, and 300f) are in the stored state.

The server 600 is also configured to maintain the charging stand corresponding to the parking slot in which no vehicle is parked in the stored state. For example, the station St1 is in a state shown in FIG. 4, when the parking slots 400a, 400c, 400e, and 400g, of the parking slots included in the station St1, are reserved and parking for each of the parking slots 400a, 400c, and 400g is completed, but parking for the parking slot 400e is not completed. In this case, each of the parking slots 400b, 400d, and 400f corresponds to the vacant slot. The server 600 maintains the charging stand 300e corresponding to the parking slot 400e in which no vehicle is parked in the stored state, in addition to the charging stands 300b, 300d, and 300f corresponding to the vacant slots. Hereinafter, flow until a vehicle is parked in the parking slot 400e will be described with reference to FIG. 5.

Figure 5:
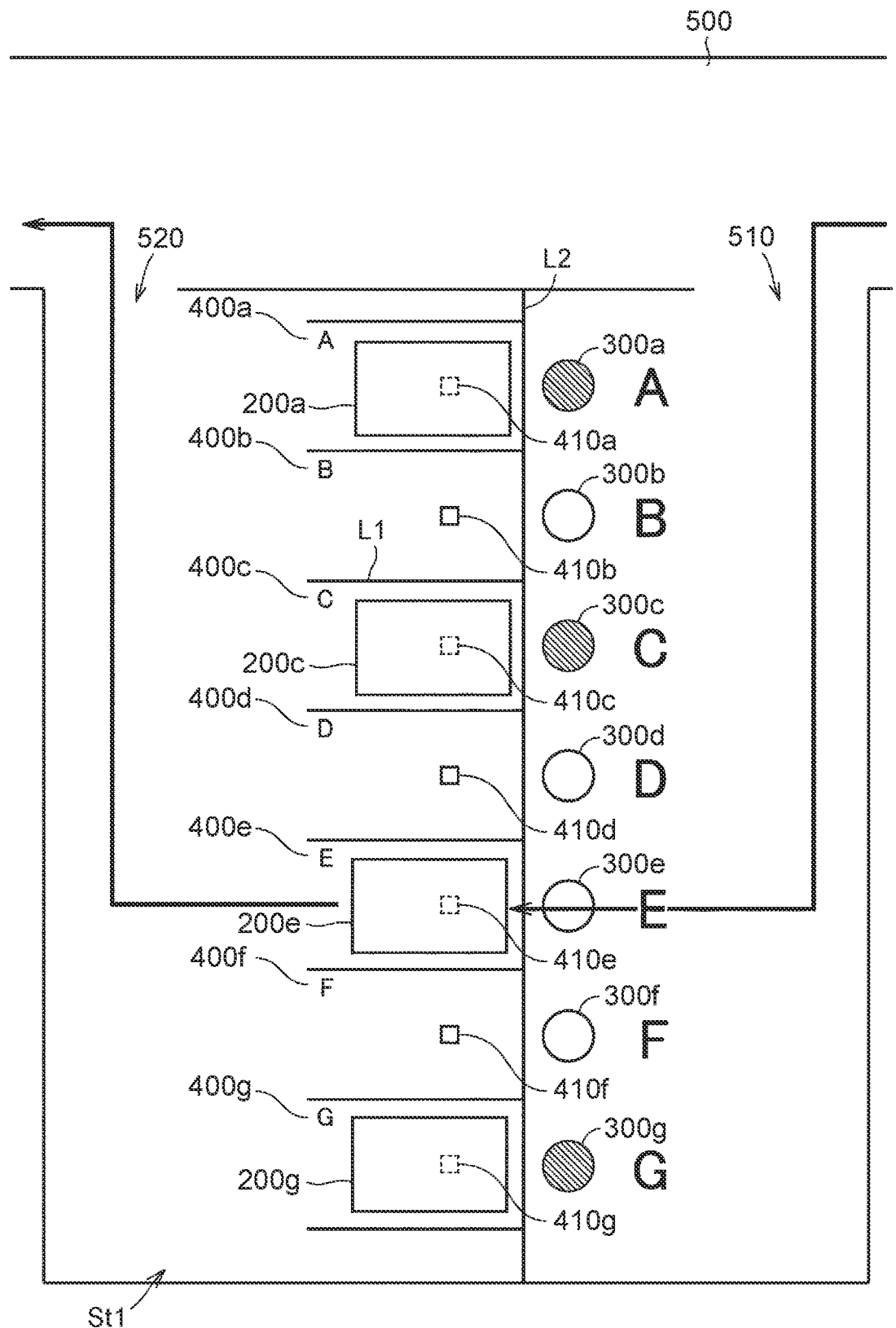
FIG. 5 is a plan view showing a second state of the station included in the power supply system according to the embodiment of the present disclosure.

FIG. 5 is a plan view showing a second state of the station St1 included in the power supply system 1 according to this embodiment. In FIG. 5, the vehicle 200e has the same configuration as the vehicle 200 shown in FIG. 1. With reference to FIG. 5, the charging stands 300a, 300c, and 300g corresponding to the parking slots in which vehicles are parked are each in a state of protruding from the ground (for example, a state in which the movable portion 301 shown in FIG. 2 is raised). On the other hand, the charging stand 300e is in the stored state (see FIG. 1) until a vehicle is parked in the parking slot 400e. The vehicle 200e travels on the road 500, approaches the station St1, enters the station St1 from the entrance 510, passes over the stored charging stand 300e, and is parked in the parking slot 400e. Since the charging stands 300d and 300f on both sides are in the stored state, the user can easily park the vehicle 200e in the parking slot 400e. After the vehicle 200e is parked in the parking slot 400e, the movable portion 301 of the charging stand 300e is raised, and the battery 210 of the vehicle 200e is charged with the charging stand 300e protruding from the ground (see FIG. 2). Charging is performed in the plug-in state. When charging is completed, the vehicle 200e and the charging stand 300e are brought into the plug-out state. After that, the vehicle 200e exits the station St1 from the exit 520 and returns to the road 500. On the other hand, the server 600 returns the charging stand 300e to the stored state. Since the vehicle 200e can move from the parking slot 400e to the exit 520 without passing over the charging stand 300e, it is not necessary to wait for the charging stand 300e to be lowered after charging is completed.

With reference to FIG. 3, the server 600 is configured to manage the station St1. The server 600 has information for managing the parking slots 400a to 400g and the charging stands 300a to 300g in the storage device 620. A plurality of vehicles, a plurality of users (more specifically, vehicle users), and a plurality of parking slots (for example, the parking slots 400a to 400g shown in FIG. 4) are registered in the server 600. Further, user terminals (for example, the mobile terminal 100 shown in FIG. 1) are also registered in the server 600 together with the users. The server 600 is configured to manage information on each registered user (hereinafter, also referred to as "user information"), information on each registered vehicle (hereinafter, also referred to as "vehicle information"), and information on each registered parking slot (hereinafter, also referred to as "parking slot information"). The information on the user terminals is included in at least one of the user information and the vehicle information. The user information, the vehicle information, and the parking slot information are stored in the storage device 620.

Identification information for identifying a user (user ID) is assigned to each user, and the server 600 manages the user information by distinguishing the user information by the user ID. The user ID also functions as information for identifying a user terminal (terminal ID). The user information includes, for example, communication address and location information of a mobile terminal carried by the user, and information for identifying a vehicle belonging to the user (vehicle ID). Further, identification information for identifying a vehicle (vehicle ID) is assigned to each vehicle, and the server 600 manages the vehicle information by distinguishing the vehicle information by the vehicle ID. The vehicle information includes, for example, a vehicle type, vehicle specifications (for example, inlet position), and information received by the server 600 from the user terminal (for example, vehicle travel plan).

Further, identification information for identifying a parking slot (parking slot ID) is assigned to each parking slot, and the server 600 manages the parking slot information by distinguishing the parking slot information by the parking slot ID. The parking slot ID also functions as information for identifying a charging stand (EVSE) provided for the parking slot. The parking slot information includes the position of the parking slot, the state of the parking slot (for example, whether a vehicle is parked), the reservation information regarding the reservation of the parking slot, and the EVSE information regarding the charging stand provided for the parking slot. As shown in FIG. 3, the reservation information includes, for example, information indicating whether the parking slot is reserved, and for the reserved parking slot, the reservation start time, the reservation end time, and the identification information of the user who reserved the parking slot (user ID). The EVSE information includes the connection state of the charging stand (plug-in state or plug-out state), the combination of the charging stand and the vehicle in the plug-in state (vehicle ID and parking slot ID), and the power supply state of the charging stand (power supply being performed or power supply stopped).

The server 600 is configured to monitor the station St1 shown in FIG. 4. The server 600 updates the parking slot information based on the information sequentially acquired from each of the charging stands 300a to 300g and the information sequentially acquired from each of the parking sensors 410*a* to 410*g*. Further, the server 600 updates the reservation information in each of the case where the parking slot is reserved and the case where the parking slot reservation is canceled.

The server 600 is configured to reserve a both side-vacant slot with priority from the vacant slots for the reservation period specified by the reservation request, when receiving a reservation request. In this embodiment, the server 600 is configured to reserve a one side-vacant slot with priority over a both side-reserved slot and reserve a both side-vacant slot with priority over the one side-vacant slot, when receiving a reservation request. The both side-reserved slot represents a vacant slot with neighboring slots on both sides thereof being reserved at the reservation start time specified by the reservation request. The one side-vacant slot represents a vacant slot with a neighboring slot on one side thereof being unreserved at the reservation start time specified by the reservation request. The both side-vacant slot represents a vacant slot with neighboring slots on both sides thereof being unreserved at the reservation start time specified by the reservation request. For example, in the station St1 shown in FIG. 4, when the parking slots 400*a*, 400*c*, and 400*g* are reserved and the other parking slots are not reserved at the reservation start time specified by the reservation request, the parking slot 400*b* corresponds to the both side-reserved slot, the parking slots 400*d* and 400*f* each correspond to the one side-vacant slot, and the parking slot 400*e* corresponds to the both side-vacant slot.

Figure 6:
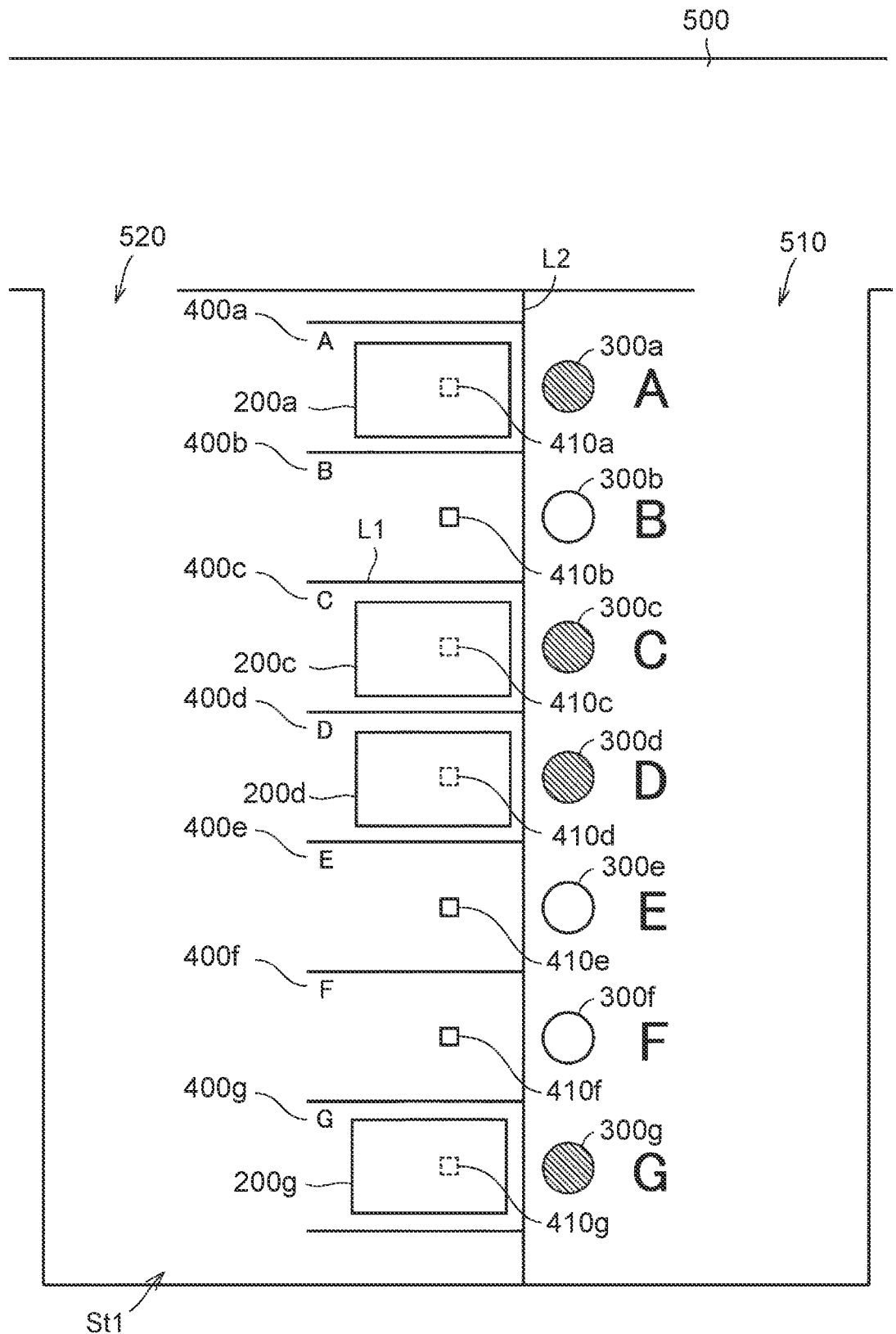
FIG. 6 is a plan view showing a third state of the station included in the power supply system according to the embodiment of the present disclosure.

FIG. 6 is a plan view showing a third state of the station St1 included in the power supply system 1 according to this embodiment. With reference to FIG. 6, when the station St1 is expected to be in the state shown in FIG. 6 during the reservation period specified by the reservation request, that is, when the parking slots 400*a*, 400*c*, 400*d*, and 400*g* are reserved at the reservation start time specified by the reservation request and the other parking slots are not reserved, the parking slot 400*b* corresponds to the both side-reserved slot, and the parking slots 400*e* and 400*f* each correspond to the one side-vacant slot. For example, when the reservation start times of the parking slots 400*a* to 400*g* are the same and the reservation end time of each of the parking slots 400*b*, 400*e*, and 400*f* is earlier than those of the other parking slots, the reservation status as described above can occur. In FIG. 6, vehicle 200*d* has the same configuration as the vehicle 200 shown in FIG. 1.

Figure 7:
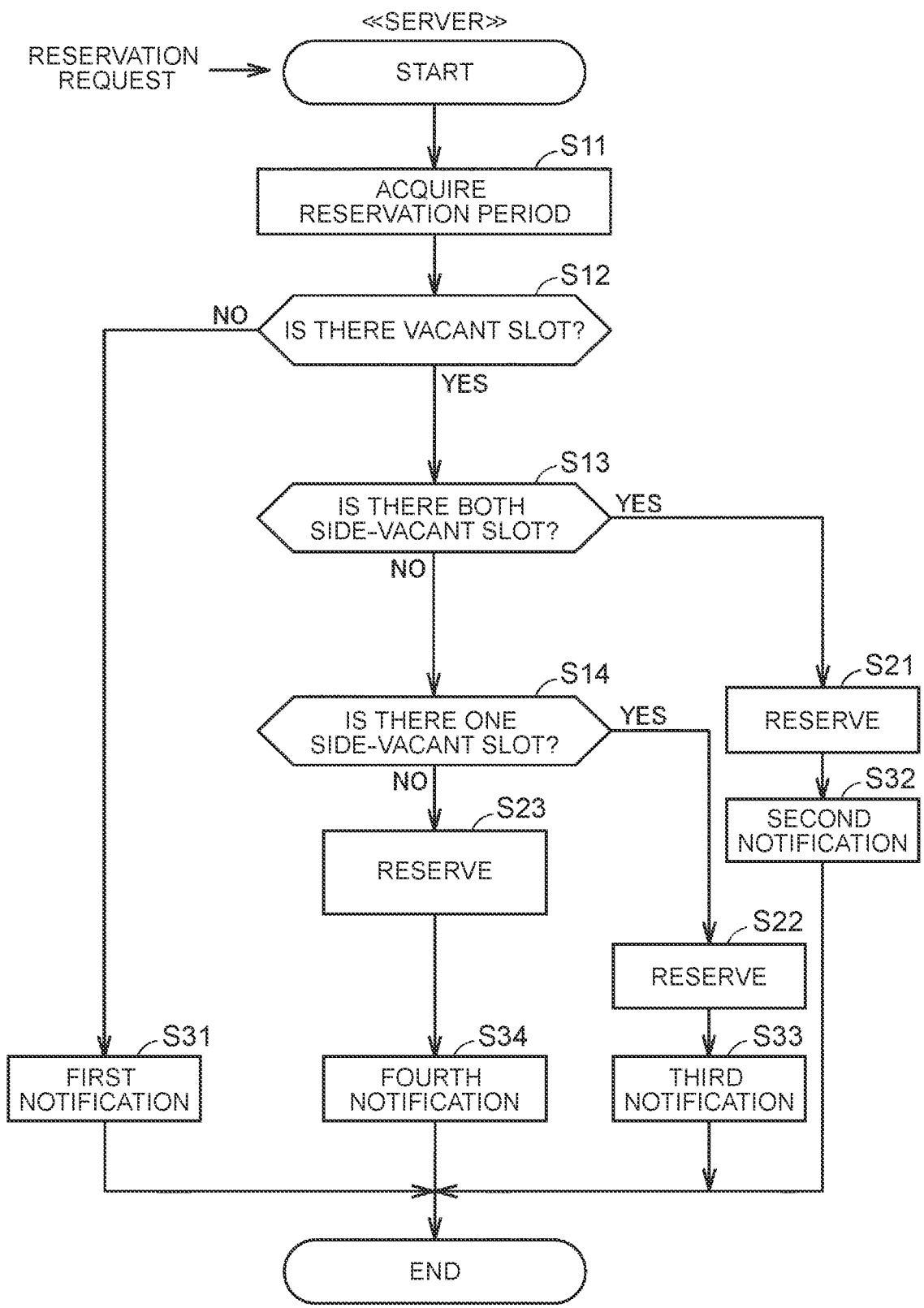
FIG. 7 is a flowchart showing a process in which the server according to the embodiment of the present disclosure reserves a parking slot.

FIG. 7 is a flowchart showing a process in which the server 600 reserves a parking slot. When receiving the reservation request, the server 600 executes a series of processes shown in FIG. 7. For example, the user of the vehicle 200 shown in FIG. 1 can operate the mobile terminal 100 (user terminal) to transmit a reservation request to the server 600. The user can include the reservation start time and the reservation end time in the reservation request. The user can set any time in predetermined time increments through the application of the mobile terminal 100. For example, the above application may be programmed such that the user can set each of the reservation start time and the reservation end time in 30-minute increments such as 0:00, 0:30, and 1:00. Hereinafter, each step in the flowchart is simply represented by "S".

With reference to FIG. 7 together with FIGS. 1 to 4, in S11, the server 600 acquires the reservation period based on the reservation request. In this embodiment, since the reservation request specifies the reservation start time and the reservation end time, the server 600 determines the period from the reservation start time to the reservation end time as the reservation period. In some embodiments, the reservation request may not include the reservation end time. In the mode in which the reservation request does not include the reservation end time, the server 600 may determine a time a predetermined time after the reservation start time specified by the reservation request as the reservation end time.

In S12, the server 600 determines whether there is a vacant slot in the station St1 (FIG. 4) for the reservation period. In this embodiment, a parking slot that is not reserved for the reservation period (that is, a parking slot that has no reservation from the reservation start time to the reservation end time) is regarded as the vacant slot. However, in the mode in which the reservation request does not include the reservation end time, the server 600 may determine whether the parking slot corresponds to the vacant slot based on whether the slot is reserved at the reservation start time.

When none of the parking slots 400*a* to 400*g* included in the station St1 corresponds to the vacant slot, it is determined as NO in S12, and the process proceeds to S31. In S31, the server 600 notifies the user who made the reservation request that there is no vacant slot for the reservation period. Specifically, the server 600 transmits a signal (hereinafter, also referred to as "first notification signal") indicating a reservation status (including the fact that there is no vacant slot for the reservation period) to the terminal (for example, the mobile terminal 100) of the user who made the reservation request. After executing the process of S31, the server 600 ends the series of processes shown in FIG. 7 without reserving a parking slot.

When receiving the first notification signal, the mobile terminal 100 executes a predetermined notification process. FIG. 8 is a diagram illustrating a notification process executed by the mobile terminal 100 (user terminal) that has received the first notification signal. When receiving the first notification signal, the mobile terminal 100 displays, for example, the screen shown in FIG. 8. This screen contains a message informing the user that there is no vacant slot for the reservation period. When the user operates the mobile terminal 100 to transmit a reservation request specifying another reservation period to the server 600, the server 600 starts the series of processes shown in FIG. 7 again.

With reference to FIG. 7 together with FIGS. 1 to 4, when any of the parking slots 400*a* to 400*g* included in the station St1 corresponds to the vacant slot, it is determined as YES in S12, and the process proceeds to S13. In S13, the server 600 determines whether the vacant slots include a both side-vacant slot (that is, a vacant slot with the neighboring slots on both sides being unreserved at the reservation start time specified by the reservation request). When the vacant slots include a both side-vacant slot, it is determined as YES in S13, and the process proceeds to S21. In S21, the server 600 reserves the both side-vacant slot for the reservation period. For example, when the parking slots 400*a*, 400*c*, and 400*g* are reserved and the other parking slots are not reserved (see FIG. 4) at the reservation start time specified by the reservation request, the server 600 reserves the parking slot 400*e*.

When all of the parking slots 400*a* to 400*g* correspond to the vacant slots, each of the parking slots 400*a* to 400*g* corresponds to both side-vacant slot. When the vacant slots include a plurality of both side-vacant slots, the server 600 selects and reserves one of the both side-vacant slots in S21. The server 600 may randomly select one of the both side-vacant slots, or may select one of the both side-vacant slots in accordance with a predetermined rule. The server 600 may select one of the both side-vacant slots based on the length of the reservation period, for example. When the reservation period is longer than the reference time, the server 600 may select a both side-vacant slot located farthest from the entrance (on the parking slot 400g side) among the both side-vacant slots, and when the reservation period is shorter than the reference time, the server 600 may select a both side-vacant slot located closest to the entrance (on the parking slot 400a side) among the both side-vacant slots. When a vehicle is parked in the parking slot closer to the entrance for a long time, it tends to be difficult for other vehicles to enter and exit the station St1. Therefore, by assigning a parking slot away from the entrance to the user who requests the reservation for a long period of time as described above, other vehicles can easily enter and exit the station St1.

As described above, the server 600 reserves one parking slot in response to the reservation request from the user (S21). Then, the server 600 updates the parking slot information (more specifically, the reservation information) stored in the storage device 620. After that, in S32, the server 600 notifies the user who made the reservation request, of the identification information of the reserved parking slot and the reservation status of the neighboring slots on both sides thereof. Specifically, the server 600 transmits a signal (hereinafter, also referred to as "second notification signal") indicating the identification information of the reserved parking slot (parking slot ID) and indicating that the reserved parking slot is the both side-vacant slot (that is, the neighboring slots on both sides of the reserved slot are not reserved), to the terminal (for example, the mobile terminal 100) of the user who made the reservation request.

When receiving the second notification signal, the mobile terminal 100 executes a predetermined notification process. FIG. 9 is a diagram illustrating the notification process executed by the mobile terminal 100 (user terminal) that has received the second notification signal. When receiving the second notification signal, the mobile terminal 100 displays, for example, the screen shown in FIG. 9. This screen displays a message informing the user of the fact that the reservation of the parking slot is completed, the reservation period, the identification information (for example, E) of the parking slot reserved for the reservation period (for example, the parking slot 400e), and the reservation status (more specifically, presence or absence of reservation) of the neighboring slots on both sides of the reserved parking slot. Even after the display is completed, the user can cause the mobile terminal 100 to execute the notification process at any timing.

With reference to FIG. 7 together with FIGS. 1 to 4, when the vacant slots include no both side-vacant slot, it is determined as NO in S13, and the process proceeds to S14. In S14, the server 600 determines whether the vacant slots include a one side-vacant slot (that is, a vacant slot with a neighboring slot on one side being unreserved at the reservation start time specified by the reservation request). When the vacant slots include a one side-vacant slot, it is determined as YES in S14, and the process proceeds to S22. In S22, the server 600 reserves the one side-vacant slot for the reservation period. When the vacant slots include a plurality of one side-vacant slots, the server 600 selects and reserves one of the one side-vacant slots in S22. The server 600 may randomly select one of the one side-vacant slots, or may select one of the one side-vacant slots in accordance with a predetermined rule. For example, the server 600 may select one of the one side-vacant slots such that the both side-reserved slot does not occur. For example, when the parking slot 400e (one side-vacant slot) is selected in the case where the parking slots 400a, 400c, 400d, and 400g are reserved and the other parking slots are not reserved (see FIG. 6) at the reservation start time specified by the reservation request, the parking slot 400d becomes the both side-reserved slot. In such a reservation status, the server 600 may select the parking slot 400f (one side-vacant slot) such that the both side-reserved slot does not occur.

As described above, the server 600 reserves one parking slot in response to the reservation request from the user (S22). Then, the server 600 updates the parking slot information (more specifically, the reservation information) stored in the storage device 620. After that, in S33, the server 600 notifies the user who made the reservation request of the identification information of the reserved parking slot and the reservation status of the neighboring slots on both sides thereof. Specifically, the server 600 transmits a signal (hereinafter, also referred to as "third notification signal") indicating the identification information of the reserved parking slot (parking slot ID) and indicating that the reserved parking slot is the one side-vacant slot (that is, the neighboring slot on one side of the reserved slot is reserved), to the terminal of the user who made the reservation request (hereinafter, also referred to as "request user terminal"). Further, the server 600 transmits, to the terminal of the user who has reserved the parking slot next to the parking slot reserved in response to the reservation request (hereinafter, also referred to as "neighboring user terminal"), a signal indicating that the neighboring parking slot has been reserved (hereinafter, also referred to as "neighboring reservation notification signal"). Each of the request user terminal and the neighboring user terminal is, for example, the mobile terminal 100 shown in FIG. 1.

When receiving the third notification signal, the request user terminal executes a predetermined notification process. FIG. 10 is a diagram illustrating the notification process executed by the request user terminal that has received the third notification signal. When receiving the third notification signal, the request user terminal displays, for example, the screen shown in FIG. 10. This screen displays a message informing the user of the fact that the reservation of the parking slot is completed, the reservation period, the identification information (for example, F) of the parking slot reserved for the reservation period (for example, the parking slot 400f), and the reservation status (more specifically, presence or absence of reservation) of the neighboring slots on both sides of the reserved parking slot. Even after the display is completed, the user can cause the request user terminal to execute the notification process at any timing.

When receiving the neighboring reservation notification signal, the neighboring user terminal executes a predetermined notification process. FIG. 11 is a diagram illustrating the notification process executed by the neighboring user terminal that has received the neighboring reservation notification signal. When receiving the neighboring reservation notification signal, the neighboring user terminal displays, for example, the screen shown in FIG. 11. This screen shows a message informing the user of the fact that the parking slot next to the parking slot reserved by the user has been reserved, reservation content of the user (for example, the parking slot ID and the reservation period), and the reservation status (more specifically, presence or absence of a reservation) of the neighboring slots on both sides of the parking slot reserved by the user. Even after the display is completed, the user can cause the neighboring user terminal to execute the notification process at any timing.

With reference to FIG. 7 together with FIGS. 1 to 4, when the vacant slots include no one side-vacant slot, it is determined as NO in S14, and the process proceeds to S23. In S23, the server 600 reserves one vacant slot for the reservation period. Determining as NO in S14 means that all the vacant slots are the both side-reserved slots. Thus, in S23, the both side-reserved slot is reserved. When there is a plurality of vacant slots (both side-reserved slots), the server 600 selects and reserves one of the vacant slots in S23. The server 600 may randomly select one of the vacant slots, or may select one of the vacant slots in accordance with a predetermined rule. For example, the server 600 may select one of the vacant slots such that the reservation end times of the neighboring parking slots are staggered. The server 600 may confirm the reservation end times of the reserved parking slots (parking slots reserved by other users). When there is a parking slot having a reservation end time different from the reservation end time specified by the reservation request in the reserved parking slots, the server 600 may select a parking slot next to that parking slot. When the reservation end times of the neighboring parking slots are staggered, it is easier for the user to perform work after charging (for example, plug-out work).

As described above, the server 600 reserves one parking slot in response to the reservation request from the user (S23). Then, the server 600 updates the parking slot information (more specifically, the reservation information) stored in the storage device 620. After that, in S34, the server 600 notifies the user who made the reservation request, of the identification information of the reserved parking slot and the reservation status of the neighboring slots on both sides thereof. Specifically, the server 600 transmits a signal (hereinafter, also referred to as "fourth notification signal") indicating the identification information of the reserved parking slot (parking slot ID) and indicating that the reserved parking slot is the both side-reserved slot (that is, the neighboring slots on both sides of the reserved slot are reserved), to the request user terminal (terminal of the user who made the reservation request). Further, the server 600 transmits the neighboring reservation notification signal (signal indicating that the neighboring parking slot has been reserved) to each of a first neighboring user terminal and a second neighboring user terminal. Each of the first neighboring user terminal and the second neighboring user terminal is a terminal of a user who has reserved a parking slot next to the parking slot reserved in response to the reservation request. Each of the request user terminal, the first neighboring user terminal, and the second neighboring user terminal is, for example, the mobile terminal 100 shown in FIG. 1.

FIG. 12 is a diagram illustrating the notification process executed by the request user terminal that has received the fourth notification signal. When receiving the fourth notification signal, the request user terminal displays, for example, the screen shown in FIG. 12. The content displayed on the screen shown in FIG. 12 is similar to that on the screen shown in FIG. 10. Even after the display is completed, the user can cause the request user terminal to execute the notification process at any timing. FIG. 13 is a diagram illustrating the notification process executed by the neighboring user terminal (first neighboring user terminal and second neighboring user terminal) that has received the neighboring reservation notification signal. When each of the first neighboring user terminal and the second neighboring user terminal receives the neighboring reservation notification signal, for example, the screen shown in FIG. 13 is displayed. The content displayed on the screen shown in FIG. 13 is similar to that on the screen shown in FIG. 11.

Even after the display is completed, the user can cause each neighboring user terminal to execute the notification process at any timing.

The server 600 is configured to reserve a parking slot by the process shown in FIG. 7 when receiving the reservation request. In the process shown in FIG. 7, the server 600 reserves the both side-vacant slot from the vacant slots. Therefore, it is easy for the user to reserve a both side-vacant slot (that is, a parking slot in which a vehicle can be easily parked).

Figure 14:
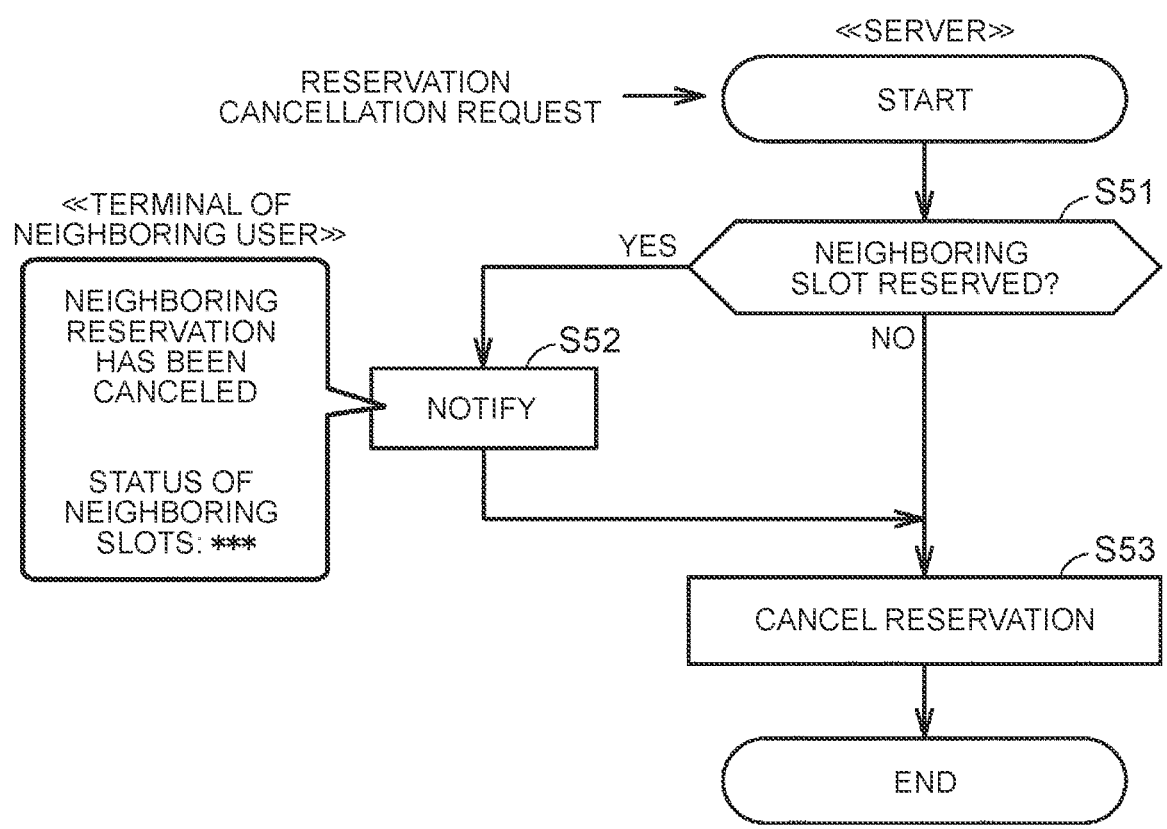
FIG. 14 is a flowchart showing a process in which the server according to the embodiment of the present disclosure cancels the reservation of the parking slot.

The server 600 is configured to cancel the reservation of the parking slot in response to a reservation cancellation request. FIG. 14 is a flowchart showing a process in which the server 600 cancels the reservation of the parking slot. When receiving the reservation cancellation request, the server 600 executes a series of processes shown in FIG. 14. For example, the user of the vehicle 200 shown in FIG. 1 can operate the mobile terminal 100 (user terminal) to transmit a reservation cancellation request indicating a cancellation target (for example, a reservation start time and a parking slot) to the server 600. Hereinafter, the parking slot to be canceled is referred to as "first parking slot", and the parking slot located next to the parking slot to be canceled is referred to as "second parking slot".

With reference to FIG. 14 together with FIGS. 1 to 4, in S51, the server 600 determines whether the second parking slot is reserved at the reservation start time to be canceled.

When it is determined as YES (there is a reservation) in S51, the server 600 notifies the user who has reserved the second parking slot that the reservation for the first parking slot has been cancelled in S52. Hereinafter, this notification is referred to as a "cancellation notification". When the neighboring slots on both sides of the first parking slot are reserved, there is a plurality of second parking slots. Therefore, the server 600 provides a cancellation notification to each of the users who have reserved the second parking slots. The user terminal (for example, the mobile terminal 100) that has received the cancellation notification executes a predetermined notification process. This user terminal displays a message informing the user of the fact that the reservation of the parking slot next to the parking slot reserved by the user has been canceled and the reservation status (more specifically, presence or absence of a reservation) of the neighboring slots on both sides of the parking slot reserved by the user.

When the cancellation notification is provided in S52, the process proceeds to S53. Also when it is determined as NO (there is no reservation) in S51, the process proceeds to S53. In S53, the server 600 cancels the cancellation target (reservation of parking slot) specified by the reservation cancellation request. Then, the server 600 updates the parking slot information (more specifically, the reservation information) stored in the storage device 620.

When the parking slot is reserved based on the reservation request, the server 600 permits only the user who made the reservation request to use the charging stand corresponding to the reserved parking slot during the reservation period. Specifically, the server 600 grants the user who made the reservation request the authority to exclusively use the parking slot reserved in response to the reservation request (hereinafter, also referred to as "use authorization") for the reservation period. However, when the reservation is canceled, the use authorization is also cancelled.

The user terminal that receives each of the first to fourth notification signals, the neighboring reservation notification signal, and the cancellation notification described above is not limited to the mobile terminal 100, and can be appropriately changed. The signal for providing each notification to the user may be transmitted to, for example, the vehicle belonging to the user. A notification device mounted on the vehicle (for example, a navigation system, a head-up display, or a meter panel) may execute the notification process. The user terminal may notify the user of the position of the reserved parking slot when the vehicle enters the station St1 (or when the vehicle approaches the reserved parking slot).

Figure 15:
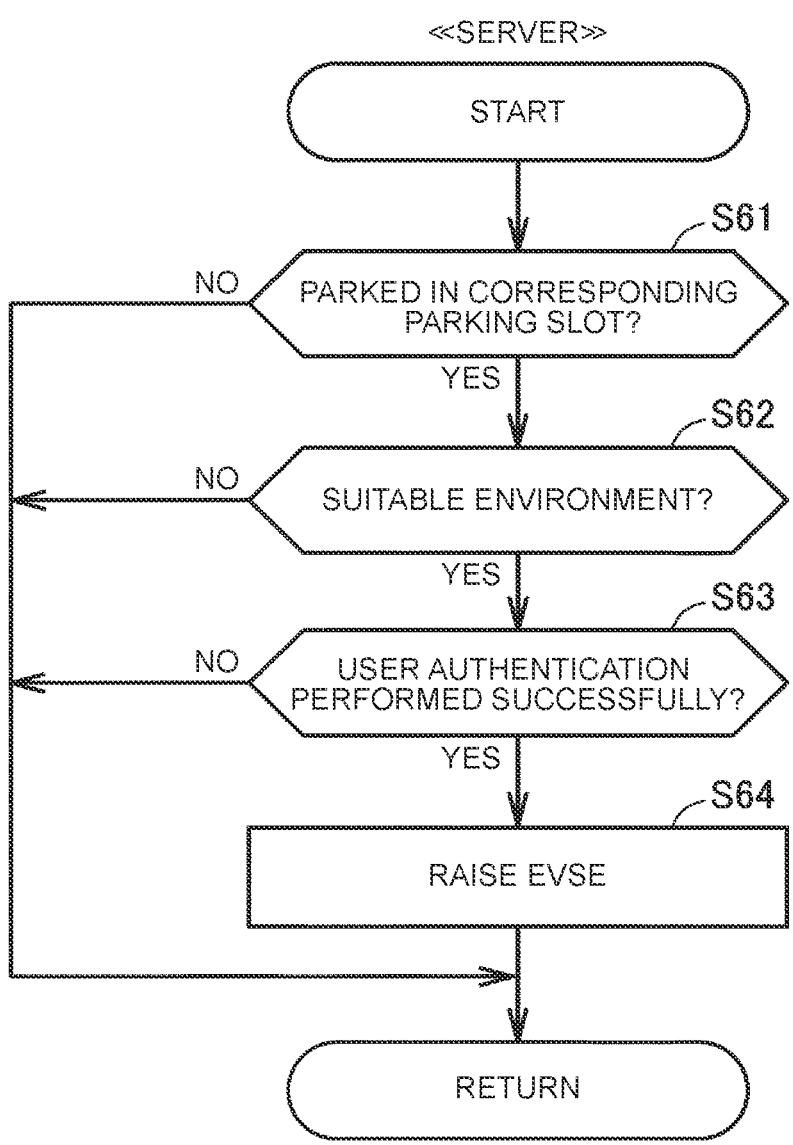
FIG. 15 is a flowchart showing a process related to the start of use of the power supply equipment managed by the server according to the embodiment of the present disclosure.

FIG. 15 is a flowchart showing a process related to the start of use of the charging stand (EVSE) managed by the server 600. The process shown in this flowchart is repeatedly executed for the charging stand in the stored state among the charging stands (charging stands 300a to 300g) included in the station St1. When there is a plurality of charging stands in the stored state, the process is executed for each charging stand. Hereinafter, the charging stand for which the process is executed is referred to as "target stand".

With reference to FIG. 15 together with FIGS. 1 to 4, in S61, the server 600 determines whether a vehicle is parked in the parking slot corresponding to the target stand. For example, when the vehicle 200 shown in FIG. 1 is parked in the parking slot, it is determined as YES in S61.

When it is determined as YES in S61, the server 600 determines whether the environment of the target stand is suitable for the start of use in S62. For example, an environment in which the movable portion 301 (FIG. 1) of the target stand is hindered from being raised is not suitable for the start of use of the target stand. In this embodiment, the server 600 acquires the detection result of the environment sensor 342 (FIG. 1) from the target stand. Then, when there is neither an object nor a living body in the vicinity of the target stand, the server 600 determines YES in S62. On the other hand, when there is at least one of the object and the living body in the vicinity of the target stand, the server 600 determines NO in S62.

When it is determined as YES in S62, the server 600 performs user authentication for the target stand in S63, and determines whether the user authentication has been performed successfully. Specifically, the server 600 searches for the reservation information based on the current time and the identification information (parking slot ID) of the parking slot corresponding to the target stand, and acquires the identification information (user ID) of the user who has the use authorization of the target stand. Subsequently, the server 600 issues an authentication code to the user who has the use authorization of the target stand, and requests the user to return the authentication code. For example, the server 600 transmits an authentication code to the mobile terminal 100 (FIG. 1) corresponding to the user ID. The user can return the authentication code by operating the mobile terminal 100. When the server 600 receives the reply in response to the above request, the server 600 determines that the user authentication has been performed successfully (YES in S63). On the other hand, when there is no reply in response to the above request even after a predetermined time has elapsed since the authentication code was issued, the server 600 determines that the user authentication has failed (NO in S63).

When it is determined as YES in all of S61 to S63, the process proceeds to S64. In S64, the server 600 raises the movable portion 301 (FIG. 1) of the target stand from the first position (storage position) to the second position (power supply position). Specifically, the control device 330 of the target stand wirelessly communicates with the server 600 and controls the actuator 320 (FIG. 1) in accordance with the instruction from the server 600. The server 600 raises the movable portion 301 to a position that allows plug-in (see FIG. 2). This enables the user to use the target stand.

Hereinafter, an example of using the target stand will be described with reference to FIG. 2. With reference to FIG. 2, the user takes out the connector 311 from the cable storage portion of the target stand (charging stand 300) and connects the connector 311 to the inlet 211 of the vehicle 200 (vehicle parked in the parking slot corresponding to the target stand). Thereby, the vehicle 200 and the target stand are brought into the plug-in state.

When the target stand is brought into the plug-in state, the server 600 (FIG. 3) causes the target stand to start supplying power. Specifically, the control device 330 of the target stand wirelessly communicates with the server 600 and controls the power supply circuit 310 in accordance with the instruction from the server 600. The power supply circuit 310 converts (for example, transforms) the AC power supplied from the AC power supply 350 into AC power suitable for power supply to the vehicle 200, and supplies the converted power to the connector 311 (plug connected to the inlet 211). Then, electric power is input from the connector 311 to the inlet 211. The electric power input to the inlet 211 is supplied to the battery 210 via the charger 212. While the battery 210 is being charged, the control device 330 controls the power supply circuit 310 so as to adjust the supplied power, and the ECU 230 controls the charger 212 so as to adjust the charging power.

When charging of the battery 210 is completed, the user operates the touch panel display 313 of the target stand to input a stop instruction instructing a power supply stop to the target stand. However, when the battery 210 is fully charged, the ECU 230 automatically transmits the stop instruction to the control device 330. Further, when the reservation end time of the parking slot corresponding to the target stand arrives, the server 600 (FIG. 3) transmits the stop instruction to the target stand. The target stand stops power supply in accordance with the stop instruction. Then, the user pulls out the connector 311 from the inlet 211 of the vehicle 200, and stores the connector 311 and the power supply cable 312 in the cable storage portion. Thereby, the vehicle 200 and the target stand are brought into the plug-out state. When the user returns the power supply cable 312 to the cable storage portion, the control device 330 lowers the movable portion 301 to the lower limit position P1 of the movable range R2. Thus, the target stand is brought into the stored state again. In the mode in which the power supply port of the target stand is an outlet, the control device 330 of the target stand may lower the movable portion 301 when the power supply cable is detached from the outlet.

When it is determined as NO in any of S61 to S63 in FIG. 15, the server 600 does not raise the movable portion 301 (FIG. 1) of the target stand. Thereby, the target stand is maintained in the stored state. In the above embodiment, it is determined whether the predetermined raising condition is satisfied in S62 and S63. When it is determined as YES both in S62 and S63, the raising condition is satisfied. However, the raising condition is not limited to this and can be changed as appropriate. For example, the requirement of S62 may be omitted.

The configuration of the vehicle is not limited to the configuration shown in FIGS. 1 and 2. The inlet of the vehicle may be provided on a front surface of the vehicle body, a side surface of the vehicle body, or a rear surface of the vehicle body. Further, the inlet of the vehicle may be provided on a lower surface of the vehicle body (under the floor). The power supply system 1 may include underground power supply equipment that is raised from the underground and that includes a plug that is connected to an inlet provided in the lower surface of the vehicle body.

The configuration of the station included in the power supply system 1 is not limited to the configuration shown in FIG. 4. The number and the layout of the parking slots included in the station can be changed as appropriate. The station may include two or more rows of parking slots. The station may also include a parking slot on the road. Underground power supply equipment corresponding to the parking slot provided on the road may be configured to supply power to a vehicle parked on the road. Furthermore, the power supply method for the underground power supply equipment included in the station can be changed as appropriate. The power supply system 1 may include at least one of the stations St2 to St4 shown in FIGS. 16 to 18 described below in place of or in addition to the station St1 shown in FIG. 4.

Figure 16:
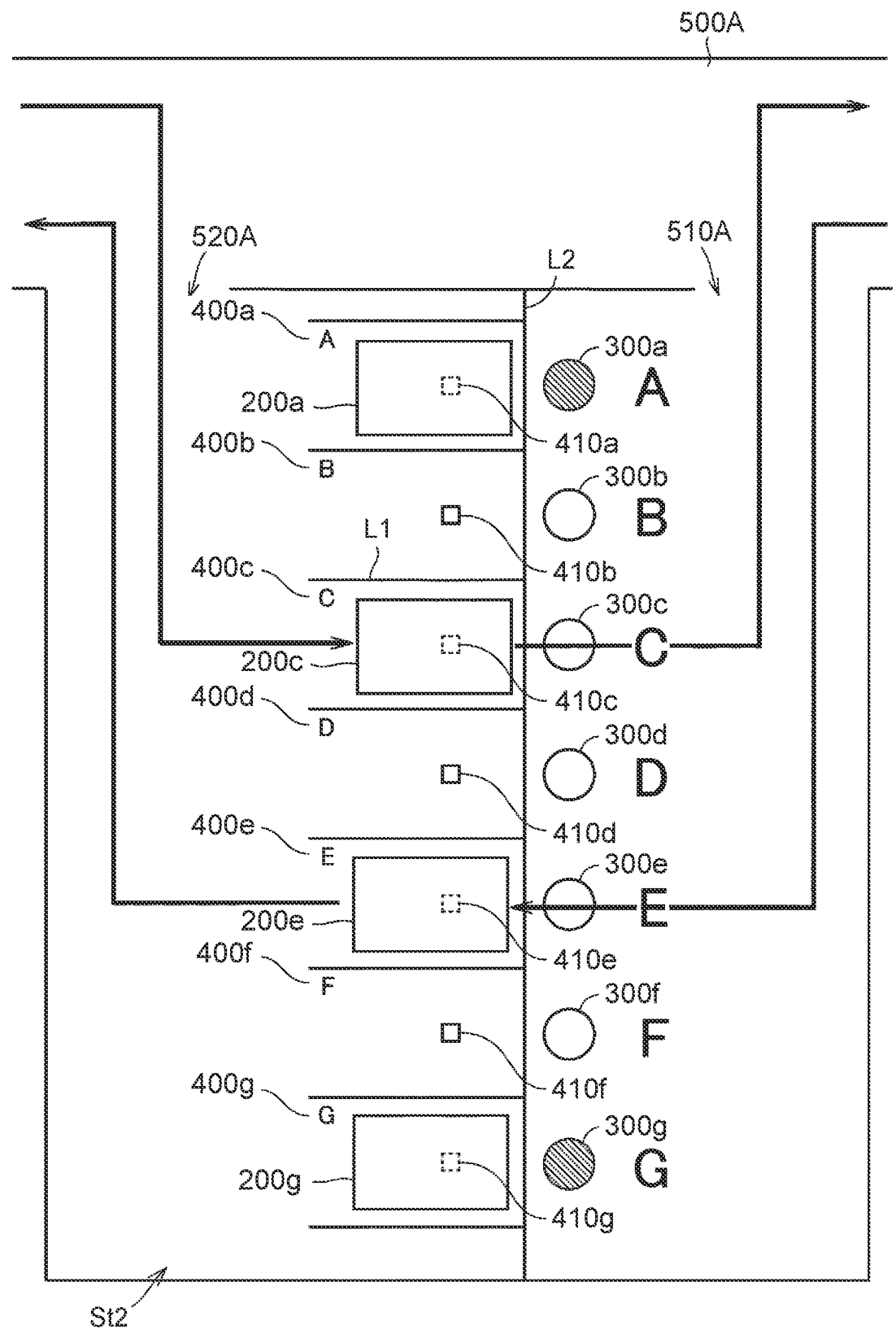
FIG. 16 is a diagram showing a first modification of the station included in the power supply system according to the embodiment of the present disclosure.

FIG. 16 is a diagram showing a first modification of the station included in the power supply system 1. With reference to FIG. 16, a station St2 is adjacent to a road 500A. In the station St2, the entrance 510 and the exit 520 shown in FIG. 4 are changed to an entrance/exit 510A and an entrance/exit 520A, respectively. In the station St2, not only a vehicle provided with an inlet at the rear of the vehicle body but also a vehicle provided with an inlet at the front of the vehicle body can use the charging stands 300*e* to 300*g*.

Figure 17:
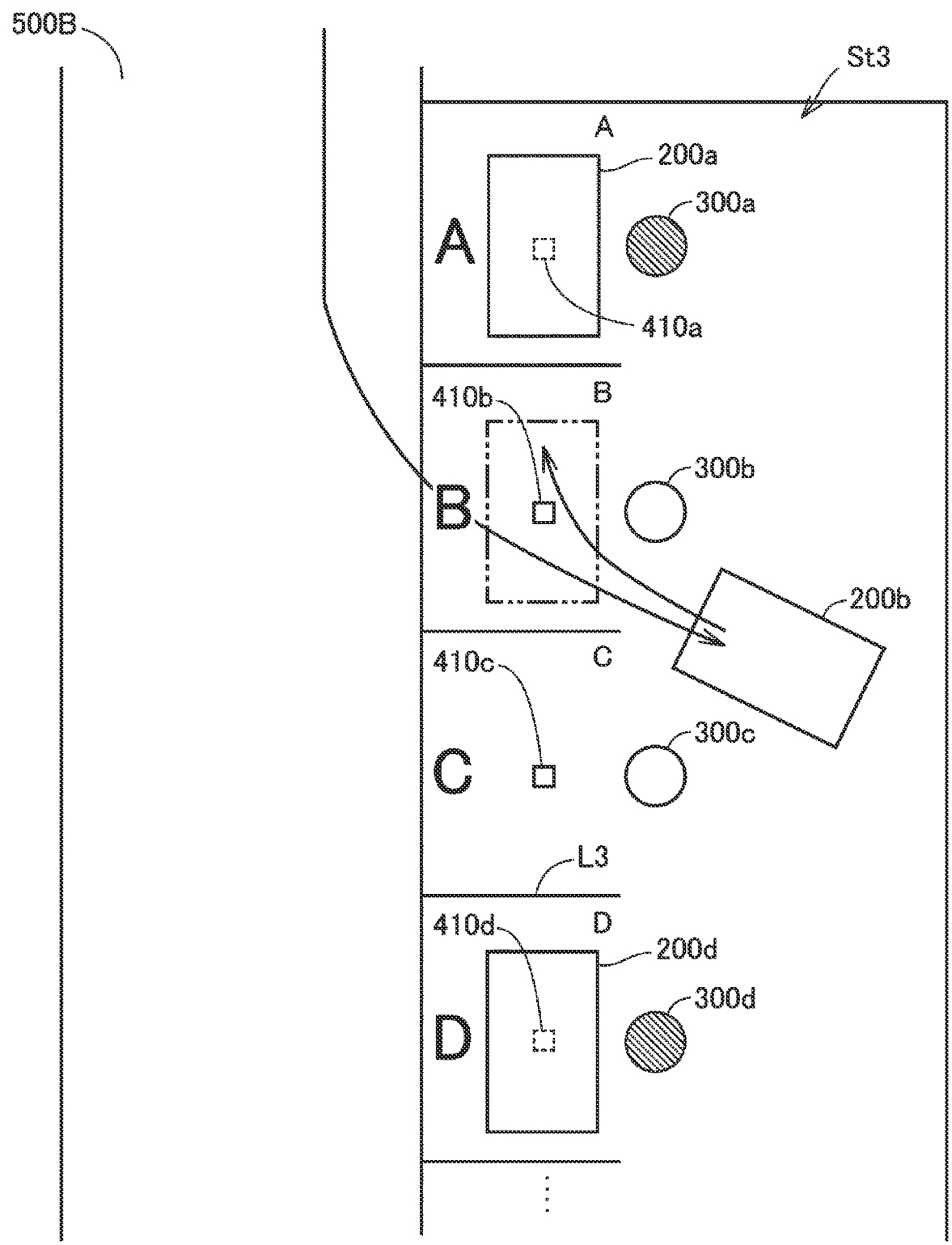
FIG. 17 is a diagram showing a second modification of the station included in the power supply system according to the embodiment of the present disclosure.

FIG. 17 is a diagram showing a second modification of the station included in the power supply system 1. With reference to FIG. 17, a station St3 is adjacent to a road 500B. A plurality of parking slots in the station St3 (parking slots 400*a*, 400*b*, 400*c*, 400*d*, . . . ) is arranged in a row along the road 500B. The parking slots in the station St3 are partitioned by a plurality of partition lines L3 so as to be arranged side by side in the longitudinal direction. The parking slots in the station St3 are provided along the longitudinal direction of each parking slot. Each of the plurality of charging stands in the station St3 (charging stands 300*a*, 300*b*, 300*c*, 300*d*, . . . ) is EVSE for a vehicle provided with an inlet on the left side surface of the vehicle body.

Figure 18:
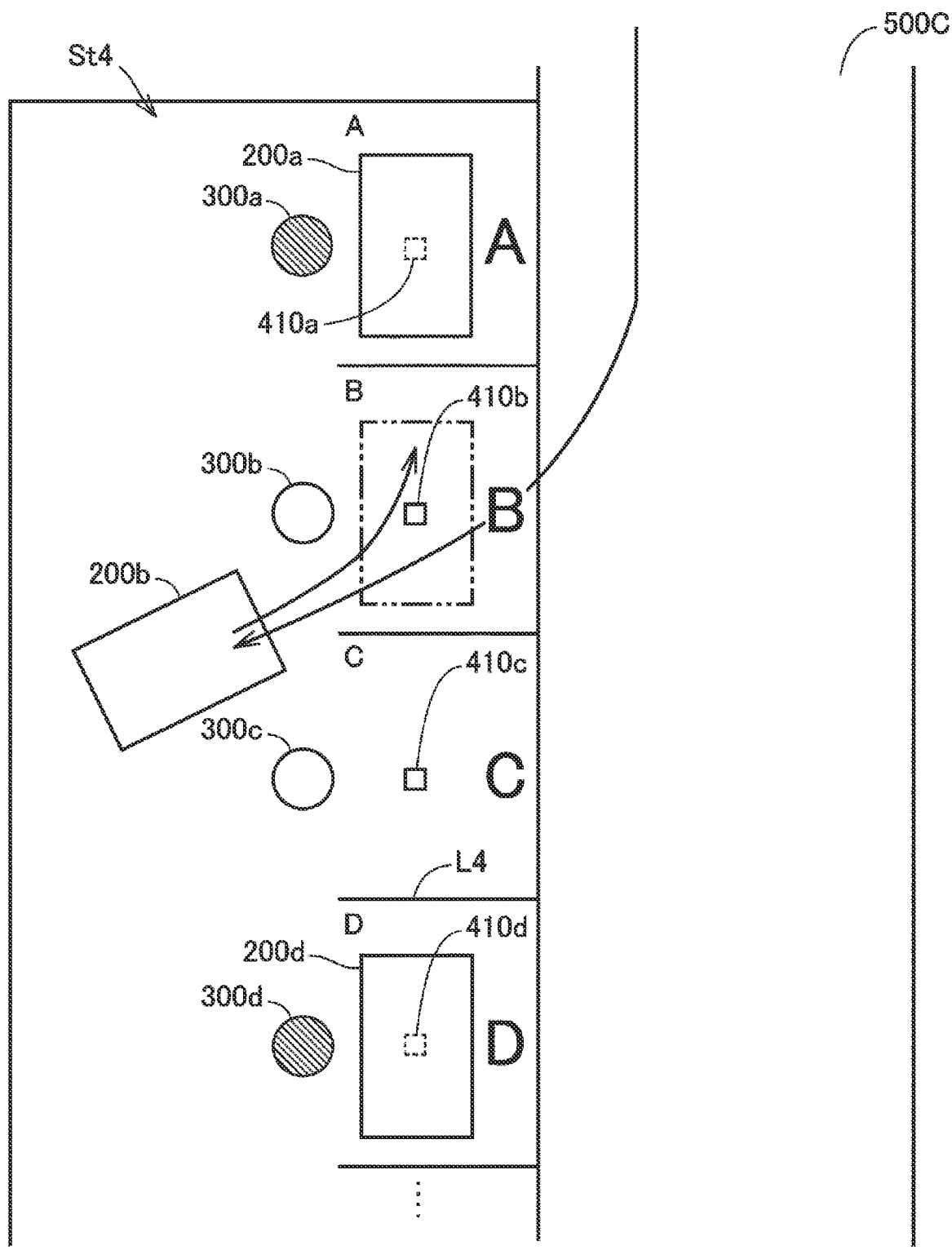
FIG. 18 is a diagram showing a third modification of the station included in the power supply system according to the embodiment of the present disclosure.

FIG. 18 is a diagram showing a third modification of the station included in the power supply system 1. With reference to FIG. 18, a station St4 is adjacent to a road 500C. A plurality of parking slots in the station St4 (parking slots 400*a*, 400*b*, 400*c*, 400*d*, . . . ) is arranged in a row along the road 500C. The parking slots in the station St4 are partitioned by a plurality of partition lines L4 so as to be arranged side by side in the longitudinal direction. The parking slots in the station St4 are provided along the longitudinal direction of each parking slot. Each of the plurality of charging stands in the station St4 (charging stands 300*a*, 300*b*, 300*c*, 300*d*, . . . ) is EVSE for a vehicle provided with an inlet on the right side surface of the vehicle body.

In the case where the server 600 manages various stations, if the server 600 reserves a parking slot without considering the position of the inlet of the vehicle belonging to the user who made the reservation request, the user may not be able to use the charging stand (EVSE) corresponding to the reserved parking slot. Therefore, in the mode in which the power supply system 1 includes a plurality of stations (for example, stations St1 to St4), the server 600 may use the position of the vehicle belonging to the user and the position of the inlet included in the vehicle to select one station from the plurality of stations. Such a configuration makes it easier to reserve a charging stand that the user can use. For example, when the server 600 receives the reservation request, the server 600 may execute the process shown in FIG. 19 described below instead of the process shown in FIG. 7.

Figure 19:
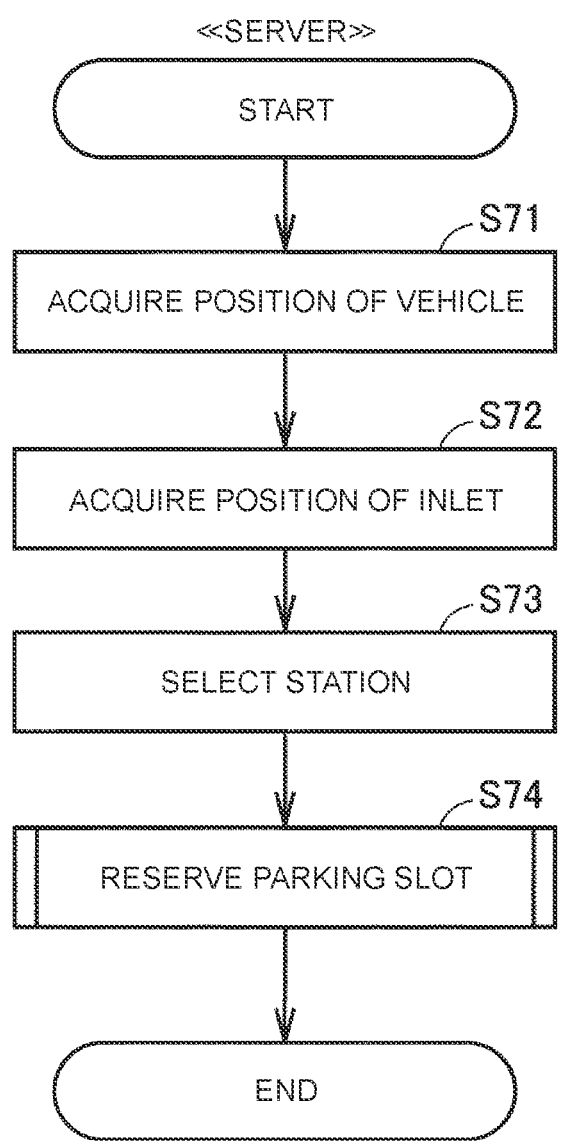
FIG. 19 is a flowchart showing a process in which the server according to the modifications reserves a parking slot.

FIG. 19 is a flowchart showing a process in which the server 600 according to the modifications reserves a parking slot. Hereinafter, the vehicle belonging to the user who has made the reservation request to the server 600 is referred to as "target vehicle".

With reference to FIG. 19 together with FIGS. 1 to 3, in S71, the server 600 acquires the position of the target vehicle at a predetermined timing. The predetermined timing may be the current time or may be around the reservation start time specified by the reservation request (for example, a timing a predetermined time before the reservation start time). In the form in which the predetermined timing is the current time, the server 600 may acquire information indicating the current position of the target vehicle (for example, position information based on the Global Positioning System (GPS)) from the target vehicle. In the mode in which the predetermined timing is around the reservation start time, the server 600 may estimate the position of the target vehicle at the predetermined timing using the travel plan of the target vehicle received from the user terminal.

Subsequently, in S72, the server 600 searches for the information stored in the storage device 620 to acquire the position of the inlet included in the target vehicle. Then, in S73, the server 600 selects one station from the plurality of stations included in the power supply system 1 using the position of the target vehicle acquired in S71 and the position of the inlet acquired in S72. Specifically, the server 600 selects a station that includes charging stands that can be used by the target vehicle, in which a parking slot corresponding to at least one of the charging stands is a vacant slot, and that is located within a predetermined range from the position of the target vehicle acquired in S71. The server 600 may specify the charging stand that can be used by the target vehicle considering the specifications of the inlet (AC/DC, charging standard, and the like) in addition to the position of the inlet.

In S74, the server 600 reserves one parking slot from the plurality of parking slots included in the one station selected as described above. Specifically, the server 600 reserves the parking slot through the process shown in FIG. 7. However, in S74, only the parking slot corresponding to the charging stand that can be used by the target vehicle is the target of reservation. With the process shown in FIG. 19, the user of the target vehicle can easily reserve a charging stand that is located near the position of the target vehicle at a predetermined timing (for example, at the current time or around the reservation start time) and that can be used by the target vehicle. This makes it easier for the user to use the charging stand (underground power supply equipment).

The vehicle is not limited to BEV, and may be a plug-in hybrid electric vehicle (PHEV). The vehicle may be configured to be DC chargeable. The power supply equipment may be DC underground power supply equipment. The power conversion circuit of the charger 212 shown in FIG. 1 may be mounted on the power supply equipment rather than the vehicle. The vehicle is not limited to a passenger car, and may be a bus or a truck. The vehicle may be configured to be able to perform autonomous driving or may be equipped with a flight function. The vehicle may be an unmanned vehicle (for example, an automated guided vehicle (AGV) or an agricultural machine).

The embodiments disclosed herein should be considered to be exemplary and not restrictive in all respects. The scope of the present disclosure is shown by the scope of claims rather than the description of the embodiments above, and is intended to include all modifications within the meaning and the scope equivalent to the scope of claims.

What is claimed is:

1. A power supply system comprising:
a plurality of parking slots;
a power supply equipment provided for each of the parking slots; and
a server that manages the plurality of parking slots and the power supply equipment provided for each of the parking slots, wherein:
the power supply equipment provided for each of the parking slots is configured to be able to be stored under a ground, and is configured to supply power to a vehicle parked in a corresponding parking slot with the power supply equipment protruding from the ground;
the server is configured to receive a reservation request that specifies a reservation start time for the parking slot; and
the server is configured to reserve, from a vacant slot, out of the parking slots, that is unreserved at the reservation start time, a parking slot with a neighboring parking slot on at least one side unreserved at the reservation start time with priority over a parking slot with neighboring parking slots on both sides reserved at the reservation start time, when the server receives the reservation request,
the parking slots are arranged in a row;
the power supply equipment provided for each of the parking slots includes:
a movable portion including a power supply port of the power supply equipment,
an actuator that moves the movable portion,
a power supply circuit that supplies electric power to the power supply port, and
a control device having a processor that controls the actuator and the power supply circuit;
the movable portion is configured to be displaced within a movable range including a first position and a second position, the first position being a position where the power supply port is stored under a ground and a top surface of the power supply equipment constitutes a road surface together with the ground, and the second position being a position where the top surface of the power supply equipment protrudes from the ground and the power supply port is exposed on the ground;
the control device is configured to wirelessly communicate with the server and control the actuator in accordance with an instruction from the server,
the server is configured to, in a case where a predetermined condition is satisfied when a vehicle is parked in one of the parking slots, displace the movable portion of the power supply equipment corresponding to the parking slot in which the vehicle is parked from the first position to the second position, the predetermined condition corresponding to when the server requests and succeeds in user authentication, and
the server is configured to reserve, from the vacant slot, a one side-vacant slot with a neighboring slot on one side unreserved at the reservation start time with priority over a both side-reserved slot with neighboring slots on both sides reserved at the reservation start time, and reserve a both side-vacant slot with neighboring slots on both sides unreserved with priority over the one side-vacant slot, when the server receives the reservation request.

2. The power supply system according to claim 1, wherein:
when the server receives the reservation request, the server acquires a reservation end time corresponding to the reservation start time based on the reservation request;
the vacant slot is a parking slot, out of the parking slots, that is unreserved for a reservation period from the reservation start time to the reservation end time;
the server is configured to maintain the power supply equipment corresponding to the unreserved parking slot as stored under the ground; and
when the parking slot is reserved based on the reservation request, the server permits only a user who made the reservation request to use the power supply equipment corresponding to the reserved parking slot for the reservation period.

3. The power supply system according to claim 2, wherein the server is configured to reserve one vacant slot for the reservation period when there is a vacant slot for the reservation period at a time of reception of the reservation request, and to notify the user who made the reservation request that there is no vacant slot for the reservation period when there is no vacant slot for the reservation period at the time of reception of the reservation request.

4. The power supply system according to claim 1, wherein the server is configured to, when the server reserves one parking slot in response to the reservation request, notify a user who made the reservation request, of identification information of the reserved parking slot and a reservation status of neighboring slots on both sides of the reserved parking slot.

5. The power supply system according to claim 1, wherein:
the server is configured to cancel a reservation of the parking slot in response to a reservation cancellation request; and
the server is configured to, when a reservation of a first parking slot that is one of the parking slots is canceled, notify a user who reserved a second parking slot located next to the first parking slot that the reservation of the first parking slot has been canceled.

6. The power supply system according to claim 1, wherein the server is configured to maintain the power supply equipment corresponding to the parking slot in which no vehicle is parked as stored under the ground.

7. A power supply system comprising a plurality of stations, wherein:
each of the stations includes a plurality of parking slots and power supply equipment provided for each of the parking slots;
the power supply equipment provided for each of the parking slots is configured to be able to be stored under a ground and includes a plug, and the power supply equipment is configured to supply electric power to the plug connected to an inlet of a vehicle parked in a corresponding parking slot with the power supply equipment protruding from the ground;
the power supply system further includes a server that receives a reservation request that specifies a reservation start time for the parking slot; and
the server is configured to, when the server receives the reservation request from a user, select one station from the stations using a position of a vehicle belonging to the user who made the reservation request and a position of the inlet included in the vehicle, and reserve, from a vacant slot, out of the parking slots included in the selected one station, that is unreserved at the reservation start time, a parking slot with a neighboring parking slot on at least one side unreserved at the reservation start time with priority over a parking slot with neighboring parking slots on both sides reserved at the reservation start time, wherein the parking slots are arranged in a row;

the power supply equipment provided for each of the parking slots includes
- a movable portion including a power supply port of the power supply equipment,
- an actuator that moves the movable portion,
- a power supply circuit that supplies electric power to the power supply port, and
- a control device having a processor that controls the actuator and the power supply circuit;

the movable portion is configured to be displaced within a movable range including a first position and a second position, the first position being a position where the power supply port is stored under a ground and a top surface of the power supply equipment constitutes a road surface together with the ground, and the second position being a position where the top surface of the power supply equipment protrudes from the ground and the power supply port is exposed on the ground;

the control device is configured to wirelessly communicate with the server and control the actuator in accordance with an instruction from the server, the server is configured to, in a case where a predetermined condition is satisfied when a vehicle is parked in one of the parking slots, displace the movable portion of the power supply equipment corresponding to the parking slot in which the vehicle is parked from the first position to the second position, the predetermined condition corresponding to when the server requests and succeeds in user authentication, and the server is configured to reserve, from the vacant slot, a one side-vacant slot with a neighboring slot on one side unreserved at the reservation start time with priority over a both side-reserved slot with neighboring slots on both sides reserved at the reservation start time, and reserve a both side-vacant slot with neighboring slots on both sides unreserved with priority over the one side-vacant slot, when the server receives the reservation request.

8. A power supply system comprising:

a plurality of parking slots;

a power supply equipment provided for each of the parking slots; and a server that manages the plurality of parking slots and the power supply equipment provided for each of the parking slots, wherein:

the power supply equipment provided for each of the parking slots is configured to be able to be stored under a ground, and is configured to supply power to a vehicle parked in a corresponding parking slot with the power supply equipment protruding from the ground;

the server is configured to receive a reservation request that specifies a reservation start time for the parking slot; and the server is configured to reserve, from a vacant slot, out of the parking slots, that is unreserved at the reservation start time, a parking slot with a neighboring parking slot on at least one side unreserved at the reservation start time with priority over a parking slot with neighboring parking slots on both sides reserved at the reservation start time, when the server receives the reservation request, the parking slots are arranged in a row;

the power supply equipment provided for each of the parking slots includes:
- a movable portion including a power supply port of the power supply equipment,
- an actuator that moves the movable portion,
- a power supply circuit that supplies electric power to the power supply port, and
- a control device having a processor that controls the actuator and the power supply circuit;

the movable portion is configured to be displaced within a movable range including a first position and a second position, the first position being a position where the power supply port is stored under a ground and a top surface of the power supply equipment constitutes a road surface together with the ground, and the second position being a position where the top surface of the power supply equipment protrudes from the ground and the power supply port is exposed on the ground;

the control device is configured to wirelessly communicate with the server and control the actuator in accordance with an instruction from the server, the server is configured to, in a case where a predetermined condition is satisfied when a vehicle is parked in one of the parking slots, displace the movable portion of the power supply equipment corresponding to the parking slot in which the vehicle is parked from the first position to the second position, the predetermined condition corresponding to when the server requests and succeeds in user authentication, and the server is configured to, when the server reserves one parking slot in response to the reservation request, notify a user who made the reservation request, of identification information of the reserved parking slot and a reservation status of neighboring slots on both sides of the reserved parking slot.

* * * * *